US012601921B2

(12) United States Patent
Bethurum et al.

(10) Patent No.: US 12,601,921 B2
(45) Date of Patent: Apr. 14, 2026

(54) HEAD-WEARABLE DEVICE FOR VIDEO CAPTURE AND VIDEO STREAMING, AND SYSTEMS AND METHODS OF USE THEREOF

(71) Applicant: Meta Platforms Technologies, LLC, Menlo Park, CA (US)

(72) Inventors: Benjamin Neal Bethurum, Shoreline, WA (US); Katy Boungard, Seattle, WA (US); Dalia Antoinette Del Rio Lazo, Seattle, WA (US); David Peter Roth, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/915,287

(22) Filed: Oct. 14, 2024

(65) Prior Publication Data

US 2025/0123491 A1      Apr. 17, 2025

Related U.S. Application Data

(60) Provisional application No. 63/591,102, filed on Oct. 17, 2023.

(51) Int. Cl.
*G02B 27/01* (2006.01)
*H04N 21/2187* (2011.01)

(52) U.S. Cl.
CPC ..... *G02B 27/0172* (2013.01); *H04N 21/2187* (2013.01); *G02B 2027/0178* (2013.01)

(58) Field of Classification Search
None
See application file for complete search history.

(56) References Cited

U.S. PATENT DOCUMENTS

2016/0019720 A1*  1/2016  Thurber ............. G02B 27/0172
                                                            345/419
2019/0104325 A1    4/2019  Linares et al.
(Continued)

FOREIGN PATENT DOCUMENTS

EP        3444788 B1    2/2020
EP        4250720 A1    9/2023

OTHER PUBLICATIONS

International Search Report and Written Opinion for International Application No. PCT/US2024/051804, mailed Dec. 18, 2024, 13 pages.

*Primary Examiner* — Aneeta Yodichkas
(74) *Attorney, Agent, or Firm* — Morgan, Lewis & Bockius LLP

(57) ABSTRACT

Systems, methods, and devices for livestreaming via a head-wearable device are disclosed. Instructions that, when executed by a head-wearable device and/or a computing device, cause the head-wearable device and/or the computing device to perform the following. In accordance with a determination that the head-wearable device satisfies one or more capture criteria, the head-wearable device and/or the computing device: cause a display of the head-wearable device to present a first UI associated with an application, cause an imaging device of the head-wearable device to capture image data, and stream the image data to other devices. In accordance with a determination that the head-wearable device does not satisfy one or more capture criteria, the head-wearable device and/or the computing device: cause another display communicatively coupled with the computing device to present a second UI associated with the application and disable the imaging device of the head-wearable device.

20 Claims, 18 Drawing Sheets

(56)         References Cited

U.S. PATENT DOCUMENTS

2022/0337697 A1     10/2022   Huang et al.
2022/0405959 A1*   12/2022   Forutanpour ......... G06T 7/0008

* cited by examiner

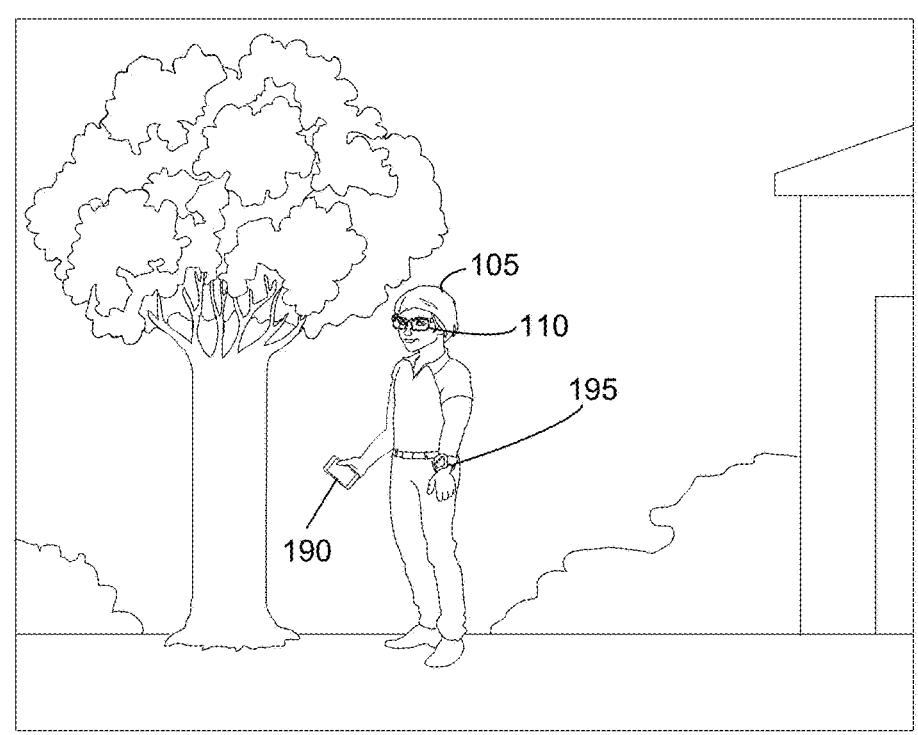
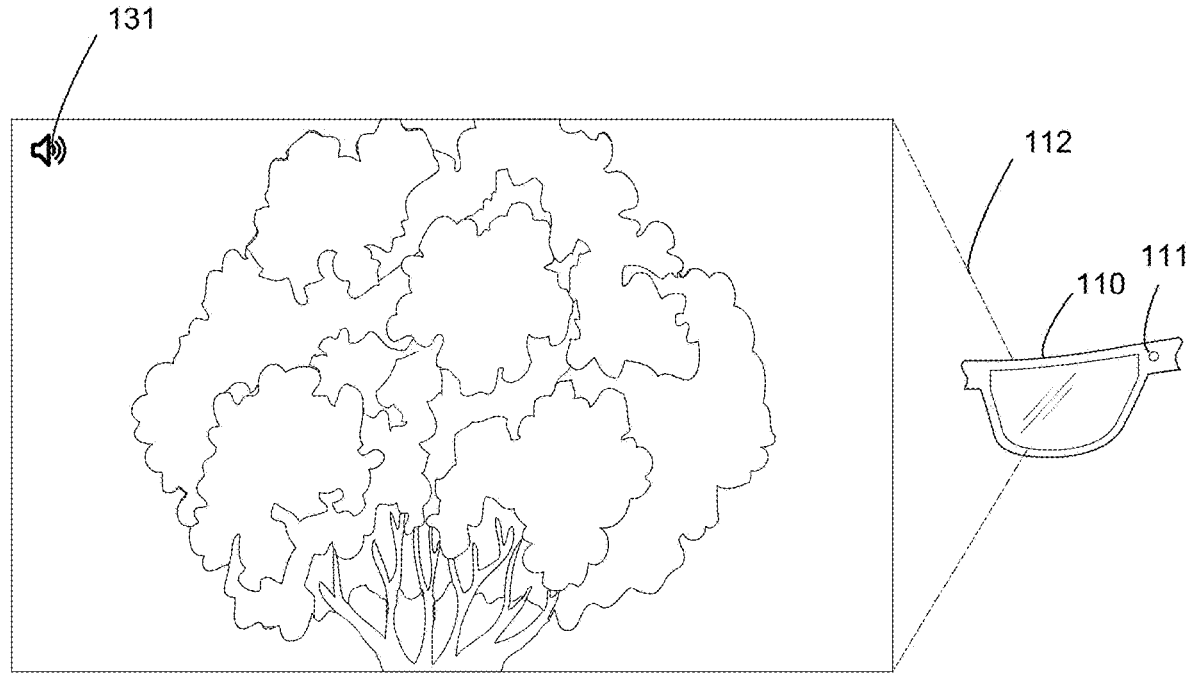
Figure 1A

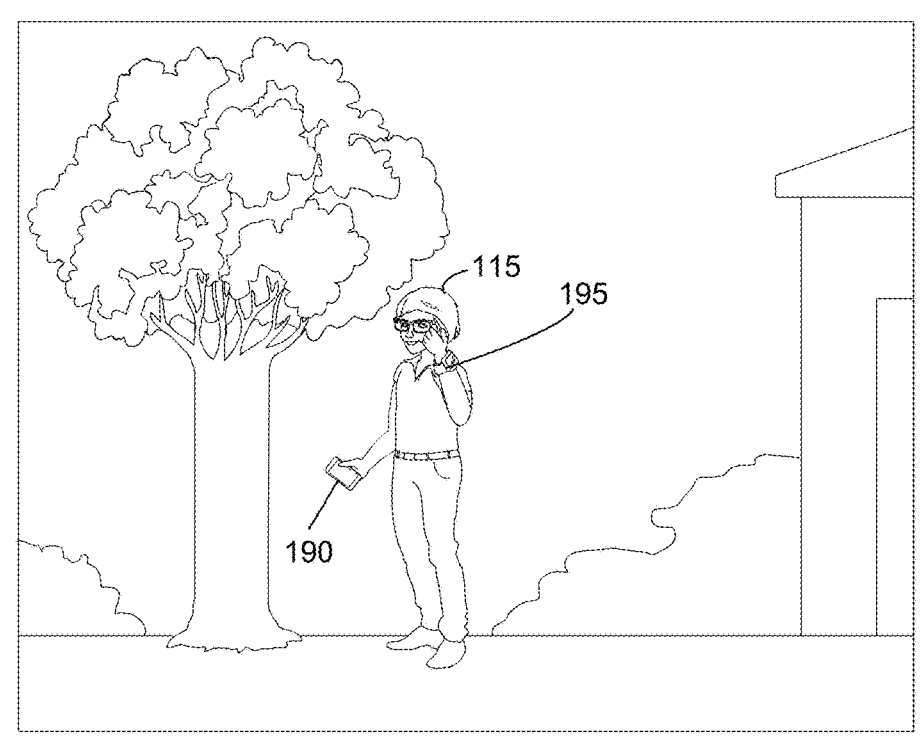
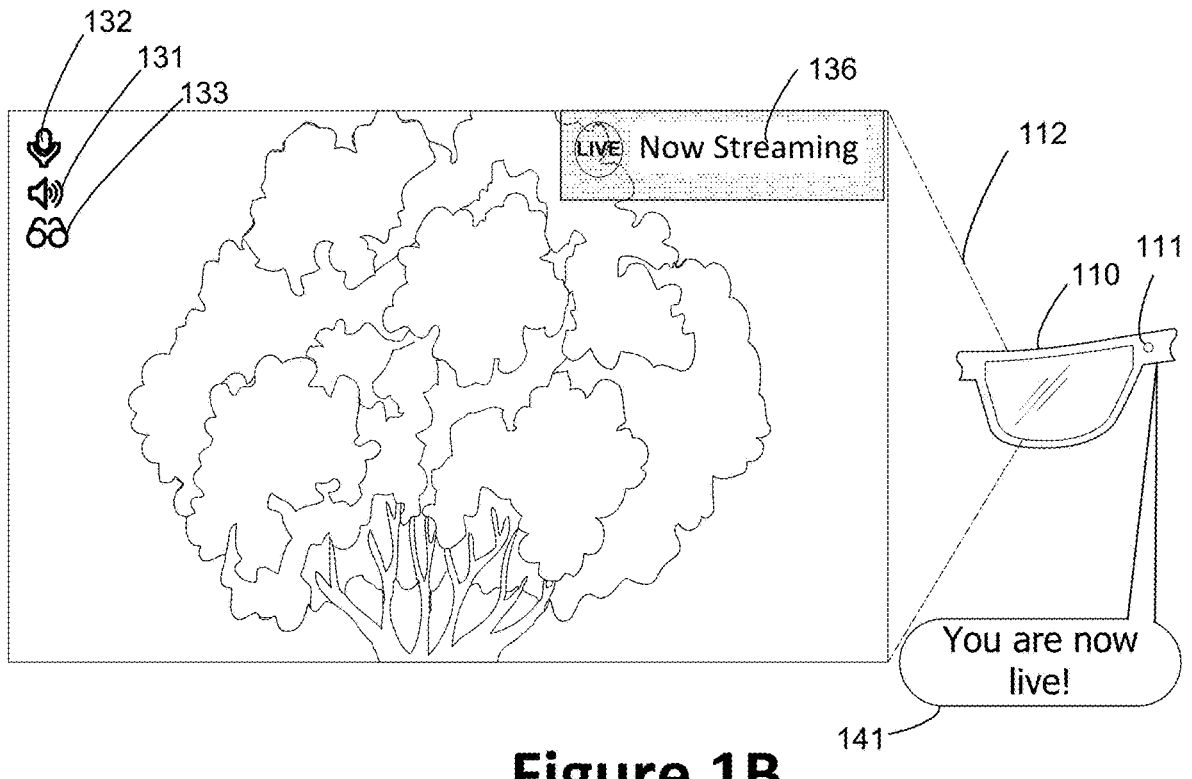
Figure 1B

135
136
112
110    111
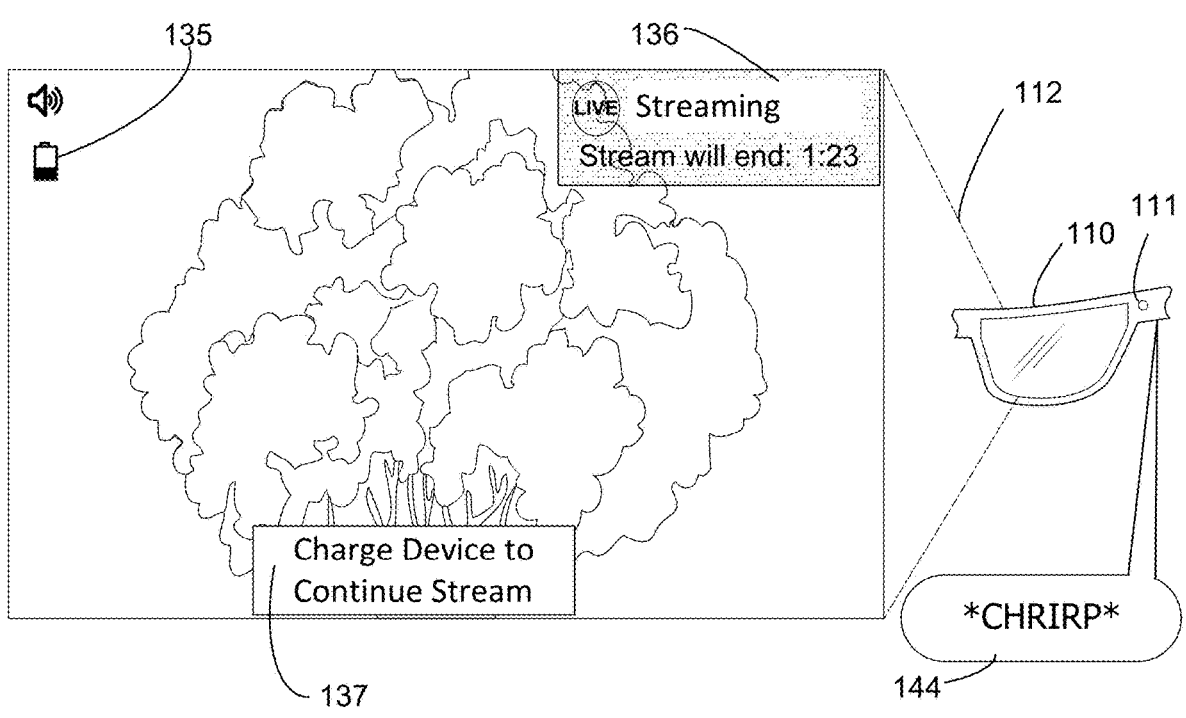
137
136
192
190
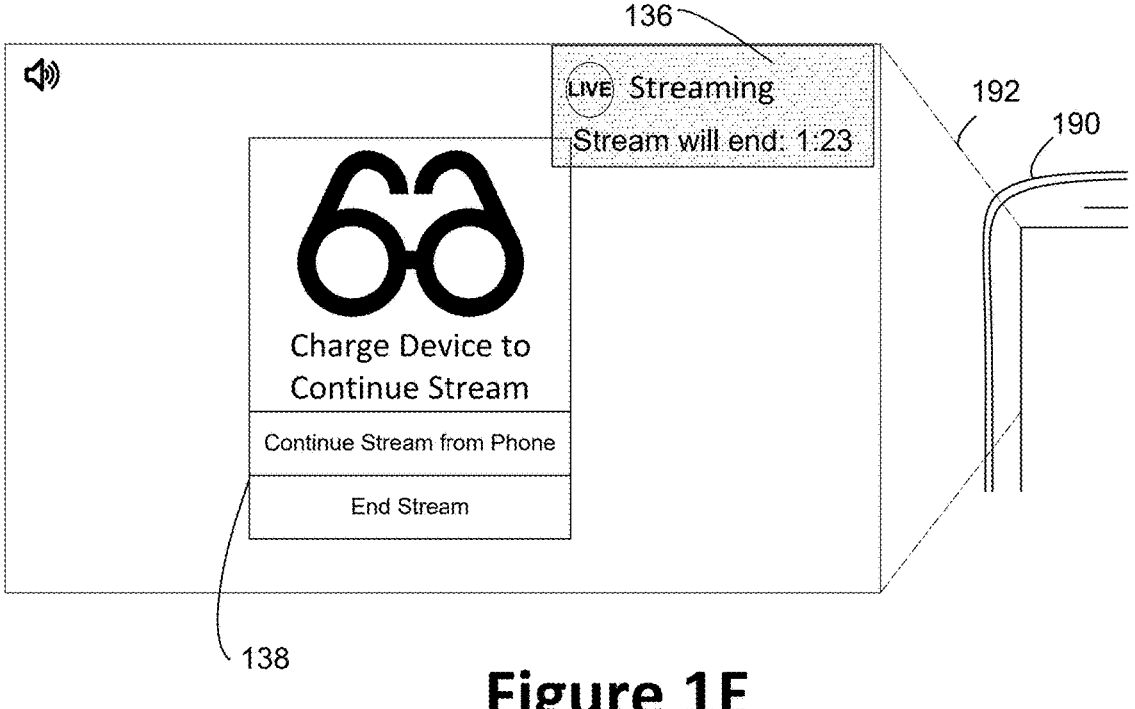
138
Figure 1E

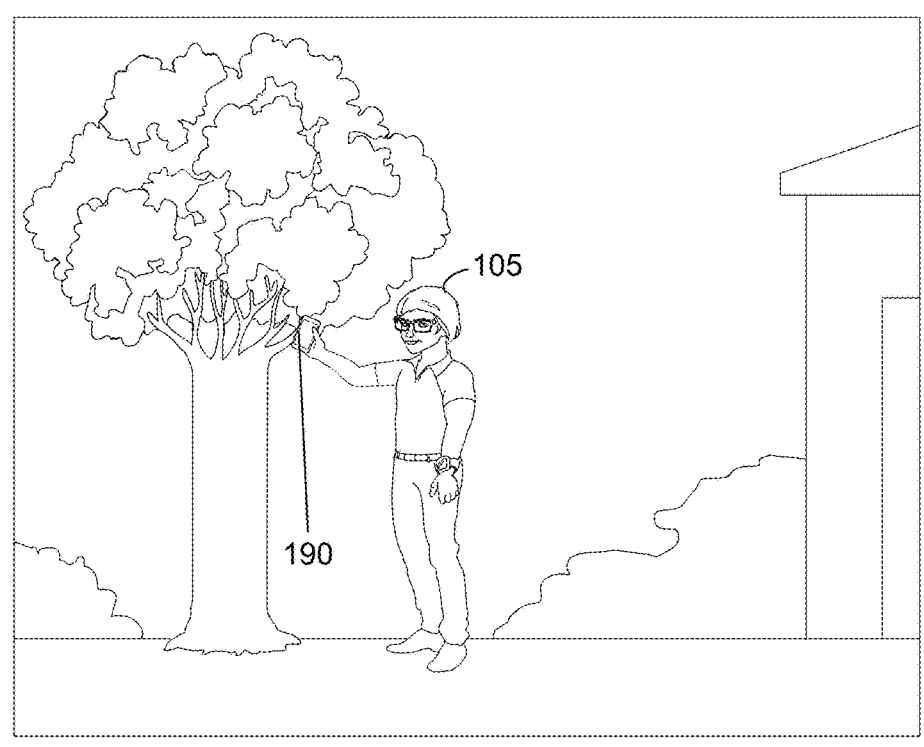
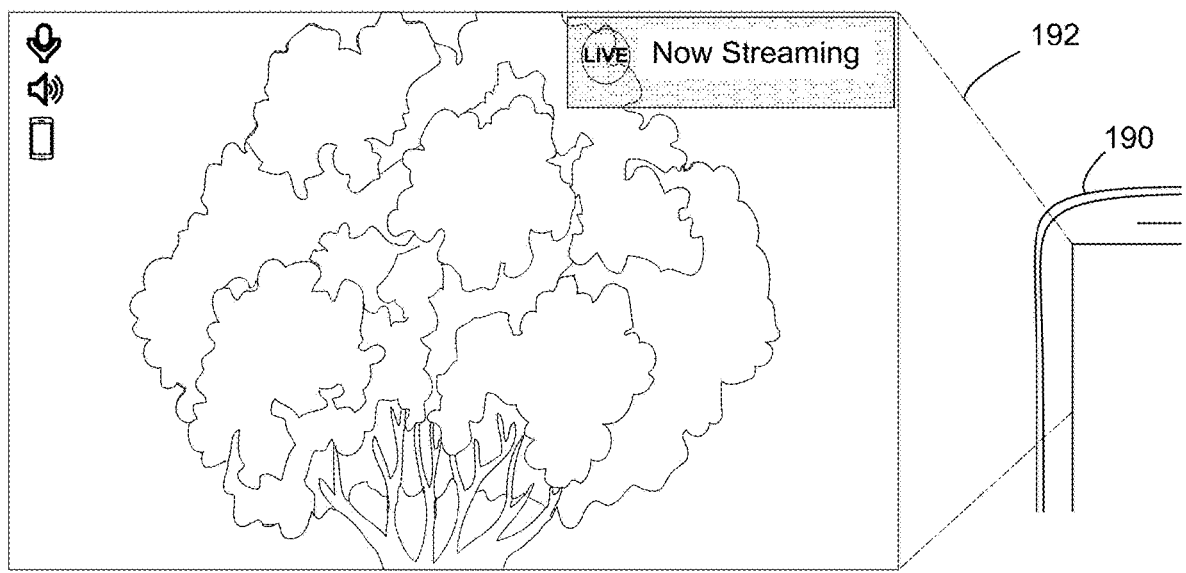
Figure 1F

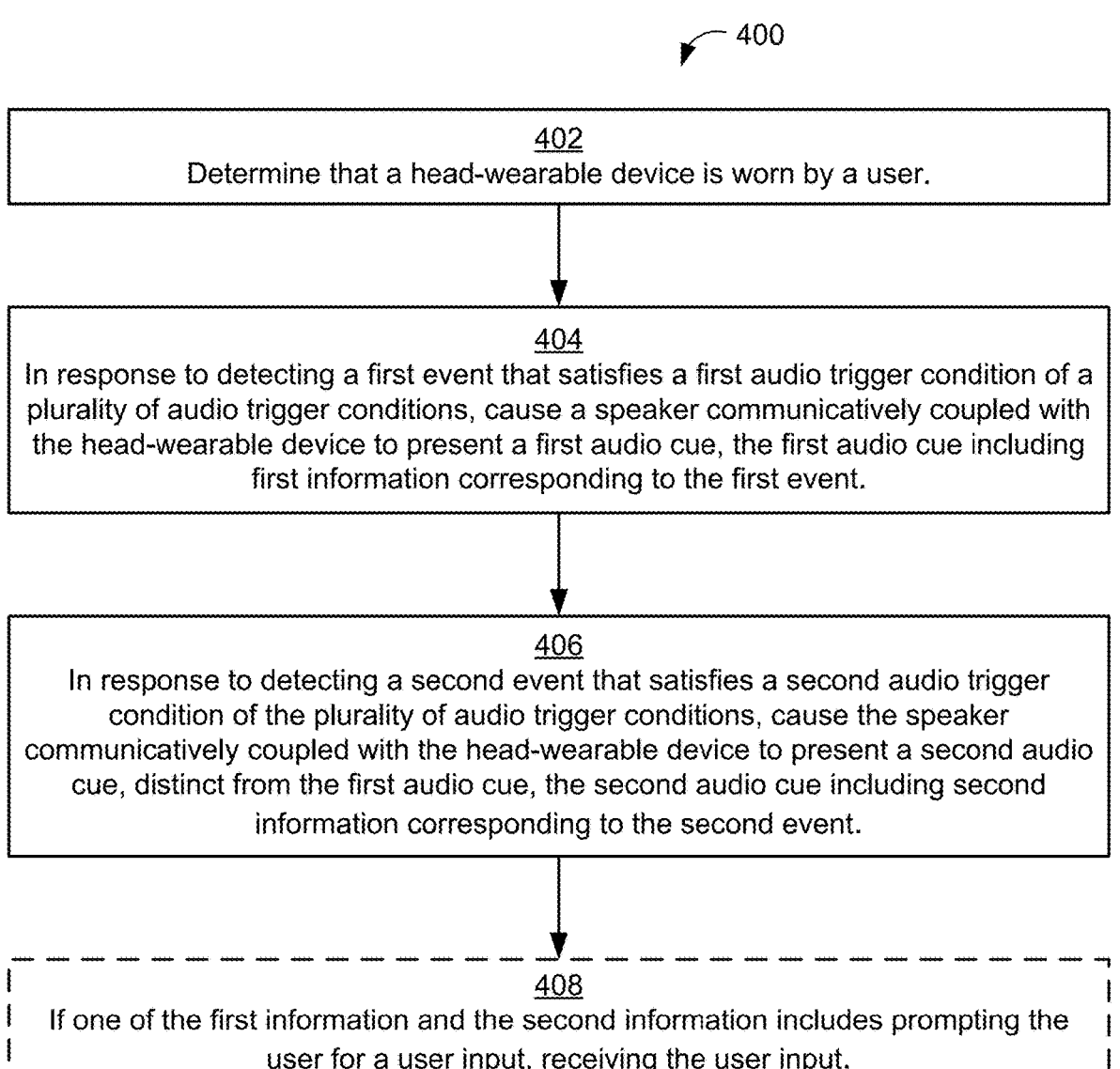

402
Determine that a head-wearable device is worn by a user.

404
In response to detecting a first event that satisfies a first audio trigger condition of a plurality of audio trigger conditions, cause a speaker communicatively coupled with the head-wearable device to present a first audio cue, the first audio cue including first information corresponding to the first event.

406
In response to detecting a second event that satisfies a second audio trigger condition of the plurality of audio trigger conditions, cause the speaker communicatively coupled with the head-wearable device to present a second audio cue, distinct from the first audio cue, the second audio cue including second information corresponding to the second event.

408
If one of the first information and the second information includes prompting the user for a user input, receiving the user input.

Figure 4

AR system 500b

AR system 500c 501    700

800

600

AR system 500c 725-4

725-6

725-2

704

739A

748

AR system 700

706-2

725-1

725-3

725-5

739B

702

706-1

VR System 710

712

714

716

739B     739C     739A     739D

739D

716

718-1

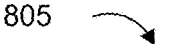
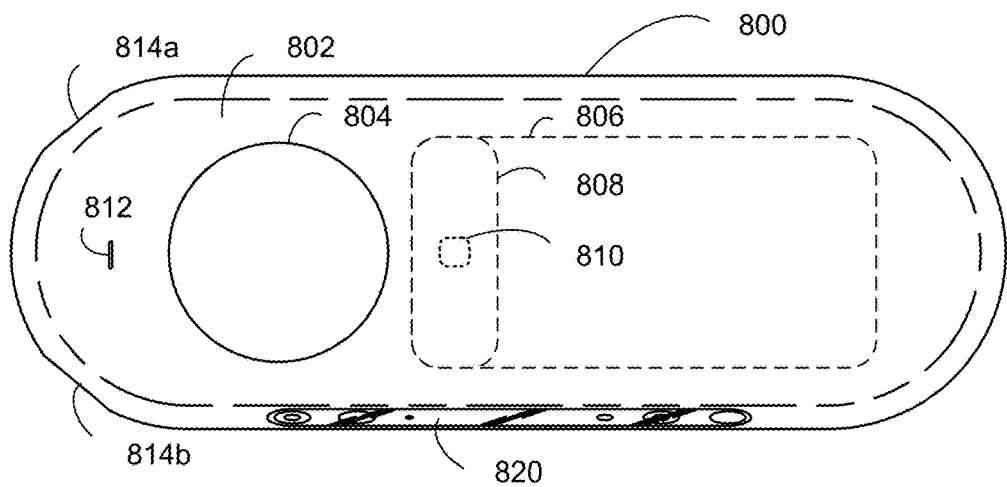
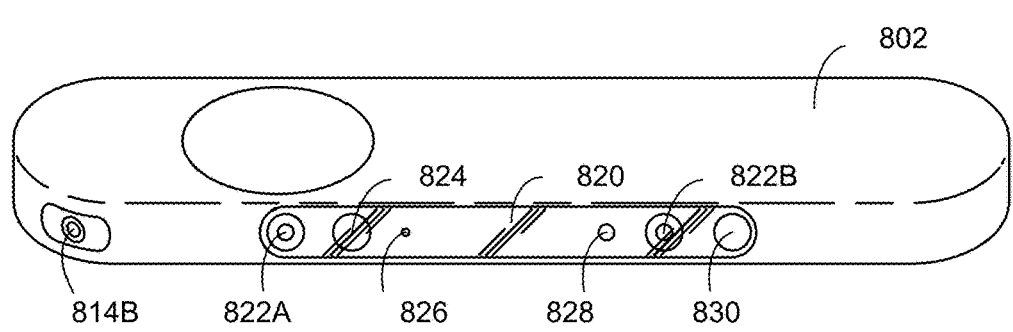
Figure 8A

HEAD-WEARABLE DEVICE FOR VIDEO CAPTURE AND VIDEO STREAMING, AND SYSTEMS AND METHODS OF USE THEREOF

PRIORITY AND RELATED APPLICATIONS

This application claims the benefit of U.S. Provisional Application No. 63/591,102, filed on Oct. 17, 2023, and entitled "Head-Wearable Device For Video Capture And Video Streaming, And Systems And Methods Of Use Thereof" which is hereby incorporated by reference in its entirety.

TECHNICAL FIELD

This relates generally to methods, systems, and devices for streaming image data from a head-wearable device to other communicatively coupled devices, including, but are not limited to, streaming image data from the head-wearable device to the other communicatively coupled devices via another computing device and providing information to a user of the head-wearable device via a display and/or audio cues.

BACKGROUND

Video streaming has become an increasingly popular form of communication and entertainment. As head-wearable augmented-reality (AR) devices also become more popular, there is a desire to video stream from these devices. Due to a desire to keep AR devices lightweight and not irritate users with overheating, the processing power of these devices is intentionally limited. Thus, there is a need for a system for performing processing-intensive activities, such as video streaming, while remaining within the processing limitations of AR devices. In addition, there is a desire for a system for communicating information to a user of the AR device while video streaming.

As such, there is a need to address one or more of the above-identified challenges. A brief summary of solutions to the issues noted above are described below.

SUMMARY

The methods, systems, and devices described herein allow livestreaming from a head-wearable device to other communicatively coupled devices via another computing device and providing information to a user of the head-wearable device via a display. One example system includes a non-transitory computer readable storage medium includes instructions that, when executed by the head-wearable device (e.g., an AR headset) and/or a computing device (e.g., a smartphone, a laptop, a wrist-wearable device and/or an intermediary processing device), cause the head-wearable device and/or the computing device to perform the following actions while a head-wearable device and a computing device are communicatively coupled. (1) In accordance with a determination, at a first point in time, that the head-wearable device 110 satisfies one or more capture criteria (e.g., a battery threshold, a thermal threshold, and/or a connectivity threshold), the head-wearable device and/or the computing device: (i) cause a display of the head-wearable device to present a first user interface associated with an application (e.g., a streaming application) running at the head-wearable device and/or the computing device, (ii) cause an imaging device (e.g., a camera) of the head-wearable device to capture image data, and (iii) stream the image data to other communicatively coupled devices (e.g., electronic devices associated with other users) via the application (e.g., the streaming application running on the other communicatively coupled devices). (2) In accordance with a determination, at a second point in time, that the head-wearable device does not satisfy one or more capture criteria, the head-wearable device and/or the computing device: (i) cause another display communicatively coupled with the computing device (e.g., a display of a smartphone, a laptop, and/or a wrist-wearable device), distinct from the display of the head-wearable device, to present a second UI associated with the application running at the head-wearable device and/or the computing device, and (ii) disable the imaging device of the head-wearable device.

Having summarized the first aspect generally related to livestreaming from a head-wearable device to other communicatively coupled devices via another computing device and providing information to a user of the head-wearable device via a display, the second aspect providing information to a user of the head-wearable device via audio cues is now summarized. As an example, a non-transitory computer readable storage medium includes instructions that, when executed by the head-wearable device (e.g., an AR headset), cause the head-wearable device to, while a head-wearable device is worn by a user, (i) in response to detecting a first event (e.g., a viewer entering a livestream of the user) that satisfies a first audio trigger condition of a plurality of audio trigger conditions, cause a speaker communicatively coupled with the head-wearable device to present a first audio cue (e.g., reciting "[the viewer's username] has entered the chat"), the first audio cue including first information corresponding to the first event, and (ii) in response to detecting a second event (e.g., a viewer commenting in the livestream) that satisfies a second audio trigger condition of the plurality of audio trigger conditions, cause the speaker communicatively coupled with the head-wearable device to present a second audio cue (e.g., reciting "[the viewer's username] says: [message]"), distinct from the first audio cue, the second audio cue including second information corresponding to the second event.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 1A-1F illustrates an example video streaming technique via a head-wearable device, in accordance with some embodiments.

FIG. 4 shows a flow diagram of an example technique for providing audio cues to communicate information to a user of a head-wearable device, in accordance with some embodiments.

FIGS. 5A-5C-2 illustrate an example AR system, in accordance with some embodiments.

FIGS. 8A-8B illustrate an example handheld intermediary processing device, in accordance with some embodiments.

Figure 1C:
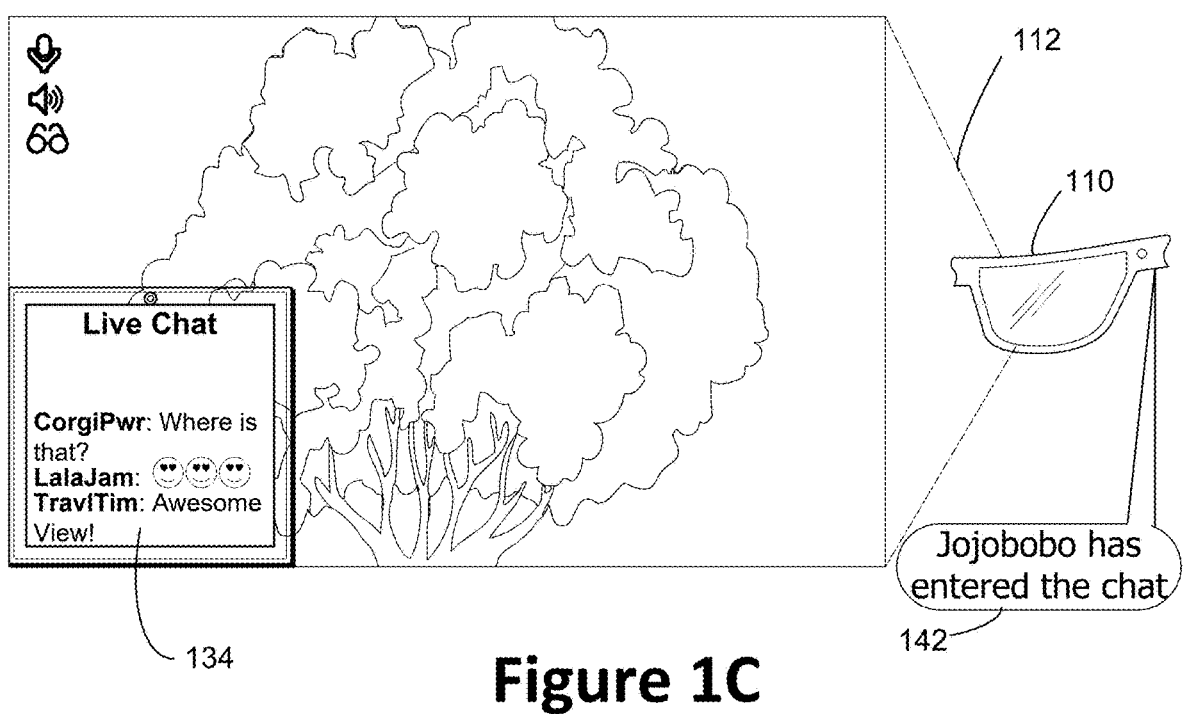

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU)s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device (e.g., the head-wearable device 110 or other communicatively coupled device, such as the wrist-wearable device 120), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight sensors, sensors of an inertial measurement unit, etc.) detected by a wearable device worn by the user and/or other electronic devices in the user's possession (e.g., smartphones, laptops, imaging devices, intermediary devices, and/or other devices described herein).

As described herein, the video streaming systems, methods, and devices disclosed allow a user to stream image data and/or audio data from a head-wearable device, a mobile device 190, a wrist-wearable device 195, and/or another communicatively coupled device to other communicatively coupled devices associated with other users. The systems, methods, and devices disclosed herein also communicate information to the user of the head-wearable device, the mobile device 190, the wrist-wearable device 195, and/or the other communicatively coupled device while video streaming via a display or audio cues.

FIGS. 1A-1F illustrate an example video streaming technique, in accordance with some embodiments. The streaming technique can be performed at an electronic device (or one or more communicatively coupled electronic devices) including at least an imaging device 111 and a communications component. For example, in FIGS. 1A-1F, the streaming technique is performed by a head-wearable device 110 communicatively coupled with at least a wrist-wearable device 195 and a mobile device 190. The head-wearable device includes at least a display 112, the imaging device 111 (e.g., a camera), an audio recording device (e.g., a microphone), a speaker, memory storing instructions for performing at least one streaming technique, and at least one processor for executing the instructions stored in the memory. In some embodiments, the head-wearable device 110 is a augmented-reality headset and/or a pair of smart glasses. Similarly, the wrist-wearable device 195 and the mobile device 190 can include respective displays, imaging devices, audio recording devices, speakers, etc. Additional components of the head-wearable device 110 and the wrist-wearable device 195 are described below in reference to FIGS. 6A-7C. The example video streaming technique can be performed at the head-wearable device 110, the mobile device 190, the wrist-wearable device 195, and/or another communicatively coupled electronic device alone or, in any combination of devices.

FIG. 1A illustrates a user 105 in an outdoor environment while wearing the head-wearable device 110, wearing the wrist-wearable device 195, and holding the mobile device 190. Each of the devices are communicatively coupled together. The head-wearable device 110 includes a display 112 which presents at least one user interface (UI) element (e.g., a speaker indicator 131, which indicates that a speaker of the head-wearable device 110 is on). The head-wearable device 110 can present to the user 105 an audio cue corresponding to a particular situation and/or ongoing operation. For example, if the user 105 runs a media streaming application at a communicatively coupled device, the head-wearable device 110 can preset an audio representation of the music played via media streaming application. In some embodiments, the audio cue can be informational and/or a virtual assistant interacting with the user 105. Additional examples of the audio cues are provided below.

FIG. 1B illustrates the user 105 activating a streaming application, in accordance with some embodiments. The user 105 performs a gesture (e.g., touching a side of the head-wearable device 110), detected by the head-wearable device 110, the mobile device 190, the wrist-wearable device 195, and/or another communicatively coupled device, which causes the head-wearable device 110 to initiate the imaging device 111 to capture image data, which can be streamed to other communicatively coupled devices. In some embodiments, the head-wearable device 110 (and/or any other communicatively coupled device) initiate a streaming application in conjunction with initiating the imaging device 111, such that the captured image data is streamed via the streaming application.

In some embodiments, the head-wearable device 110 (and/or the any other communicatively coupled device) does not initiate the imaging device 111 and/or pause the capture of image data if one or more capture criteria are not met. In some embodiments, the one or more capture criteria include one or more head-wearable device specific thresholds including a thermal threshold (e.g., a temperature of the head-wearable device 110 remains below a predetermined maximum temperature), a battery threshold (e.g., a battery level of the head-wearable device 110 remains above a minimum battery percentage), a connectivity threshold (e.g., a connectivity level between the head-wearable device 110, the mobile device 190, the wrist-wearable device 195, and/or another device associated with the user 105 and/or a connectivity level between the head-wearable device 110 and the network such as the Internet remains above a minimum signal strength), and a placement threshold (e.g., whether the head-wearable device 110 is located on the user's head). To determine whether the thresholds are satisfied, the head-wearable device 110 includes and/or communicatively coupled with one or more sensors that provide data for determining whether the threshold is satisfied. For example, the head-wearable device 110 can include at least one capacitive sensor located on at least one of two temple arms of the head-wearable device 110, and the placement threshold is a predefined minimum capacitive value of the at least one capacitive sensor. Additional examples of the sensors included in the head-wearable device are described below in reference to FIGS. 7A-7C.

The head-wearable device 110 and/or the another communicatively coupled device (e.g., the mobile device 190) can run the streaming application. In some embodiments, the head-wearable device 110 presents, via the display 112, a first UI associated with the streaming application and the other communicatively coupled device presents, via another display (distinct from display 112), a second UI associated with the streaming application. The first and the second UIs associated with the streaming application can be the same or distinct. The head-wearable device 110 can provide the captured image data to the streaming application running on the head-wearable device and/or the other communicatively coupled device and/or provide the captured image data to the other communicatively coupled device. The streaming application is configured to stream the captured image data (e.g., via a livestream) to other communicatively coupled devices (not associated with the devices of the user 105) via the streaming application (e.g., devices of other users which are also running the streaming application to view the livestream).

The head-wearable device 110, when initiating the imaging device 111, can also initiate the microphone head-wearable device 110 to capture audio data (in conjunction with the image data). The head-wearable device 110 can provide captured audio data to the streaming application running on the head-wearable device and/or the other communicatively coupled device and/or provide the capture audio data to the other communicatively coupled device. The streaming application is configured to stream the captured audio data (in conjunction with the captured image data) to other communicatively coupled devices (not associated with the devices of the user 105) via the streaming application.

While the head-wearable device 110 captures image data and/or audio data the first UI is configured to present one or more UI elements including at least one of the speaker indicator 131, a microphone indicator 132 (indicating that a microphone of the head-wearable device 110 is on), a camera indicator 133 (indicating that the imaging device 111 of the head-wearable device 110 is on), and a stream status notification 136 (notifying the user 105 that the streaming application is running). Additionally, or alternatively, the head-wearable device 110 can be configured to present one or more audio cues. Specifically, the head-wearable device 110 can supplement the first UI with audio cues or represent audio cues in place of the first UI. For example, while streaming the captured audio data and the captured image data, the head-wearable device 110 can present, via its communicatively coupled speaker, a first audio cue 141 including first information corresponding to a first event (e.g., a first event including initiating the live stream and the first information of the first audio cue 141 including an indication that a live stream was initiated "You are now live!").

In some embodiments, the streaming application is configured to transmit one or more messages in conjunction with streaming the captured audio data and the captured image data. For example, as discussed below, the streaming application can be configured to receive one or more messages from viewers of the live stream and cause a communicatively coupled display to present the one or more messages (e.g., via the display 112 of the head-wearable device 110). In some embodiments, the streaming application can also transmit one or more messages to communicatively coupled devices to provide additional information on the live stream. For example, the streaming application, in conjunction with streaming the image data and/or the audio data to the other communicatively coupled devices, can also provide one or more attribution messages and/or attribution UI elements to be presented to the users of the other communicatively coupled devices. The attribution messages and/or attribution UI elements can include information regarding the user 105 and/or the devices used by the user 105 to conduct the stream. For example, the attribution messages and/or attribution UI elements can include a message indicating that the live stream is performed via the head-wearable device 110. In some embodiments, the attribution messages and/or attribution UI elements are selectable by the users of the other communicatively coupled devices such that, when selected by a respective device, the attribution messages and/or attribution UI element cause the respective device to present additional information associated with stream of the user 105 (e.g., a store page and/or a website page associated with the head-wearable device 110).

Figure 1D:
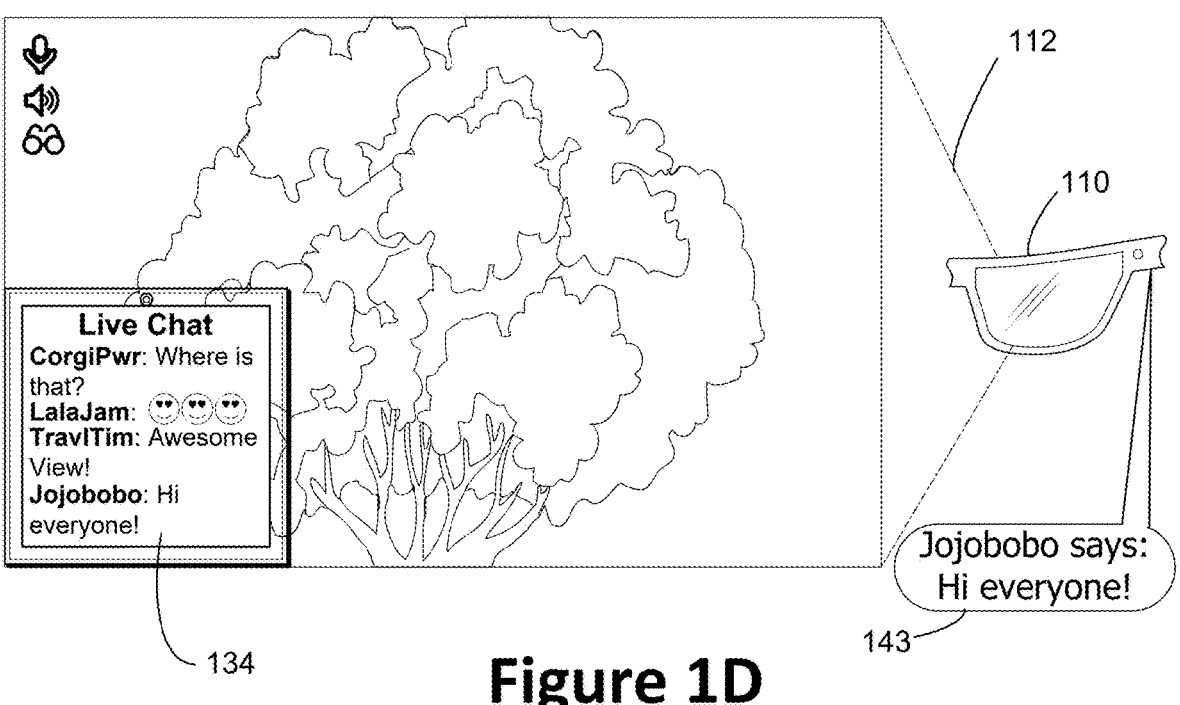

FIGS. 1C-1D illustrate additional example UI elements and audio cues associated with the example streaming application. The display 112 presents a live chat UI element 134 showing messages, emotes, emojis, emoticons, and/or other user engagements received from the other communicatively coupled devices of the other users (e.g., via the streaming application). The one or more audio cues presented by the head-wearable device 110 can assist the user 105 in engaging with participants of the live stream without requiring the user to look at a particular UI or UI elements (although the different UI's can be presented to the user 105 if desired for additional context or review). For example, the audio cues presented by the head-wearable device 110 can include information regarding the number of participants (e.g., the other communicatively coupled devices of the other users) in a live stream, when a participant enters the live stream, when a participant leaves the live stream, when a first participant enters the live stream, when the last participant leaves the live stream, when a participant provides a message to the live stream, and/or any other kind of information corresponding to an event that event that satisfies an audio trigger condition. For example, in FIG. 1C, a second audio cue 142 includes a statement "Jojobobo has entered the chat!" corresponding to an additional user viewing the livestream via the streaming application; and in FIG. 1D, a third audio cue includes a narration of a message "Jojobobo says: Hi everyone!" corresponding to the message sent from the additional user via the streaming application.

FIG. 1E illustrates a UI presented via a display communicatively coupled with the streaming application while the streaming application is running and after it is determined that the head-wearable device 110 no longer satisfies the one or more capture criteria, in accordance with some embodiments. After a period of time, the head-wearable device 110 may no longer satisfy the one or more capture criteria (e.g., the head-wearable device falls below a battery threshold, as indicated by a battery indicator 135 UI element), and in response, another display 192 communicatively coupled with the mobile device 190 (e.g., a display of the mobile device 190, as illustrated in FIG. 1E, a display of the wrist-wearable device 195, a display of a personal computer, and/or another display) presents a second UI associated with the streaming application. In some embodiments, the first UI presented by the head-wearable device 110 and/or the second UI presented by the display of the mobile device 190 notify the user 105 that the stream may be paused and/or the imaging device 111 of the head-wearable device 110 may be disabled if the one or more capture criteria are not satisfied. Alternatively, or in addition, in some embodiments, the first UI presented by the head-wearable device 110 and/or the second UI presented by the display of the mobile device 190 notify the user 105 that the imaging device of the mobile device 190 will be used to continue the stream.

In some embodiments, before the image data is transmitted to the other communicatively coupled devices, the image data is presented at the other display 192 for preview by the user 105. In some embodiments, the second UI includes at least one additional UI element (e.g., a charge device suggestion 138) which provides a suggestion for satisfying the one or more capture criteria (e.g., charge the head-wearable device 110). In some embodiments, the head-wearable device 110 and/or the computing device 190 waits a predetermined amount of time (e.g., 5 minutes) after the determination that the head-wearable device does not satisfy the one or more capture criteria before disabling the imaging device 111 (or switching to another imaging device). This allows the user 105 to correct any issues causing the head-wearable device to fail to satisfy the one or more capture criteria and/or transition to another device such that the live stream is not interrupted. In some embodiments, during the predetermined amount of time, the head-wearable device 110 presents another UI suggestion 137 suggesting the user charge the head-wearable device 110 (e.g., another suggestion for satisfying the one or more capture criteria). In some embodiments, the speaker of the head-wearable device 110 presents another audio cue 144 (e.g., a chirp sound) for notifying the user 105 that the head-wearable device no longer satisfies the one or more capture criteria.

FIG. 1F illustrates the user 105 continuing the livestream using the mobile device 190, in accordance with some embodiments. After the determination that the head-wearable device no longer satisfies the one or more capture criteria, the head-wearable device 110 and/or the mobile device 190 can continue to run the streaming application and cause an imaging device of the mobile device 190 to capture additional image data and stream the additional image data to the other communicatively coupled devices via the streaming application. In some embodiments, head-wearable device 110 and/or the mobile device 190 running the streaming application further causes a second microphone of the mobile device 190 (e.g., a microphone of the mobile device 190) to capture additional audio data and stream the additional audio data, with the additional image data, to the other communicatively coupled devices via the streaming application. The mobile device 190, when conducting the livestream, is configured to perform the similar operations performed by the head-wearable device 110 described above in reference to FIGS. 1A-1E.

Figure 2:
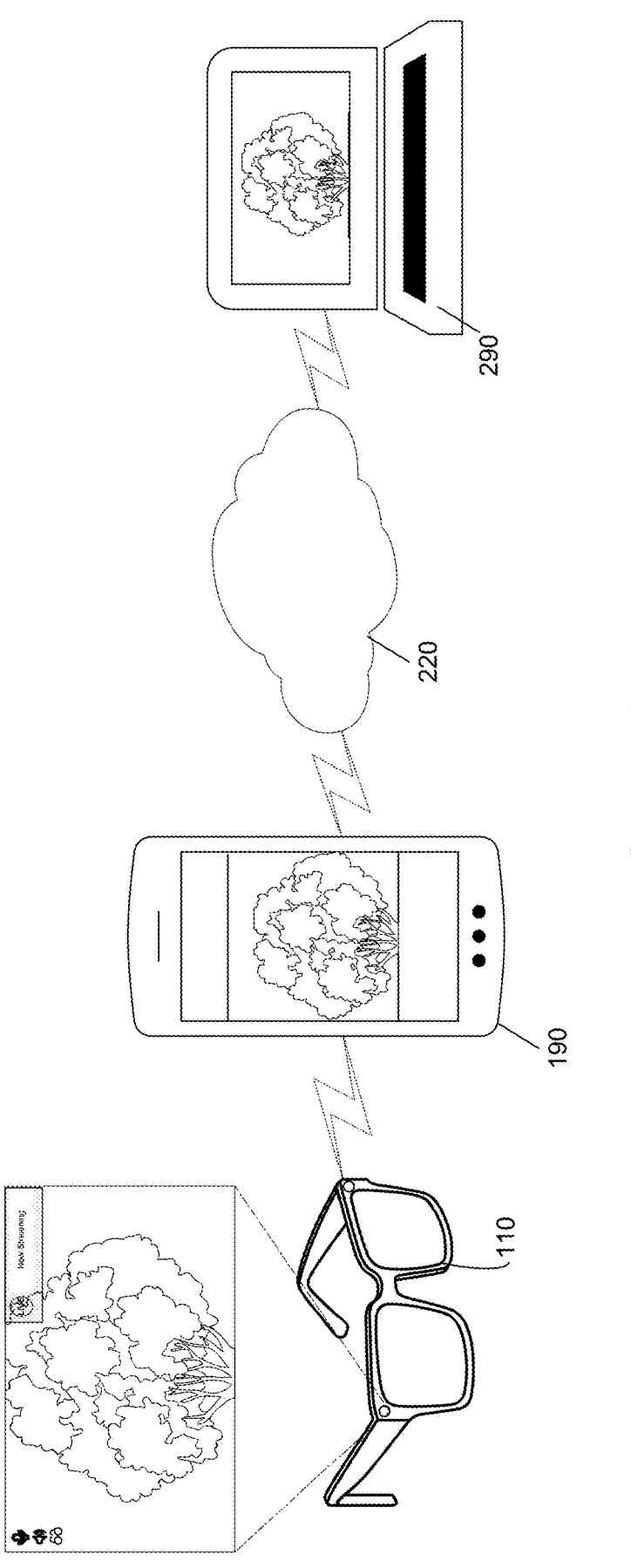
FIG. 2 illustrates an example of flow of image data from the head-wearable device 110 to other communicatively coupled devices, in accordance with some embodiments.

FIG. 2 illustrates a system for streaming captured image and/or audio data using the head-wearable device 110 and/or another communicatively coupled device, in accordance with some embodiments. As shown in FIG. 2, the head-wearable device can capture image data and/or audio data using an imaging device and/or a microphone. The head-wearable device 110 transmits the captured image data and/or audio data, via the streaming application. In some embodiments, the head-wearable device 110 uses the streaming application to transmit the captured image data and/or audio data to the mobile device 190. Alternatively, in some embodiments, the head-wearable device 110 transmits the captured image data and/or audio data directly to the mobile device 190. The head-wearable device 110 can transmit the captured image data and/or audio data over Bluetooth. In some embodiments, the image data and/or audio data are encoded by the head-wearable device 110 before being transmitted to the mobile device 190 and/or the streaming application. The mobile device 190 is configured to decode the image data and/or audio data when received by the head-wearable device 110. In some embodiments, the encoding of the image data and/or audio data is based on one or more parameters received by the head-wearable device 110 from the mobile device 190 and/or the streaming application. In some embodiments, the mobile device 190 applies one or more corrective algorithms to the image data and/or audio data (e.g., a de-warping algorithm and/or the Electronic Image Stabilization algorithm).

In some embodiments, the mobile device 190 is configured to transmit the image data and/or audio data received via the head-wearable device 110 to other communicatively coupled devices 290 (e.g., a laptop, as illustrated in FIG. 2, a personal computer, and/or a mobile device) associated with other users. The mobile device 190 can use the streaming application to distribute the image data and/or audio data (received form the head-wearable device 110) to the other communicatively coupled devices 290. The mobile device and the other communicatively coupled devices 290 can be communicatively coupled devices via a network 220 (e.g., the Internet). In some embodiments, before the image data and/or audio data is transmitted to the other communicatively coupled devices, the mobile device 190 reencodes the image data and/or audio data.

Figure 3:
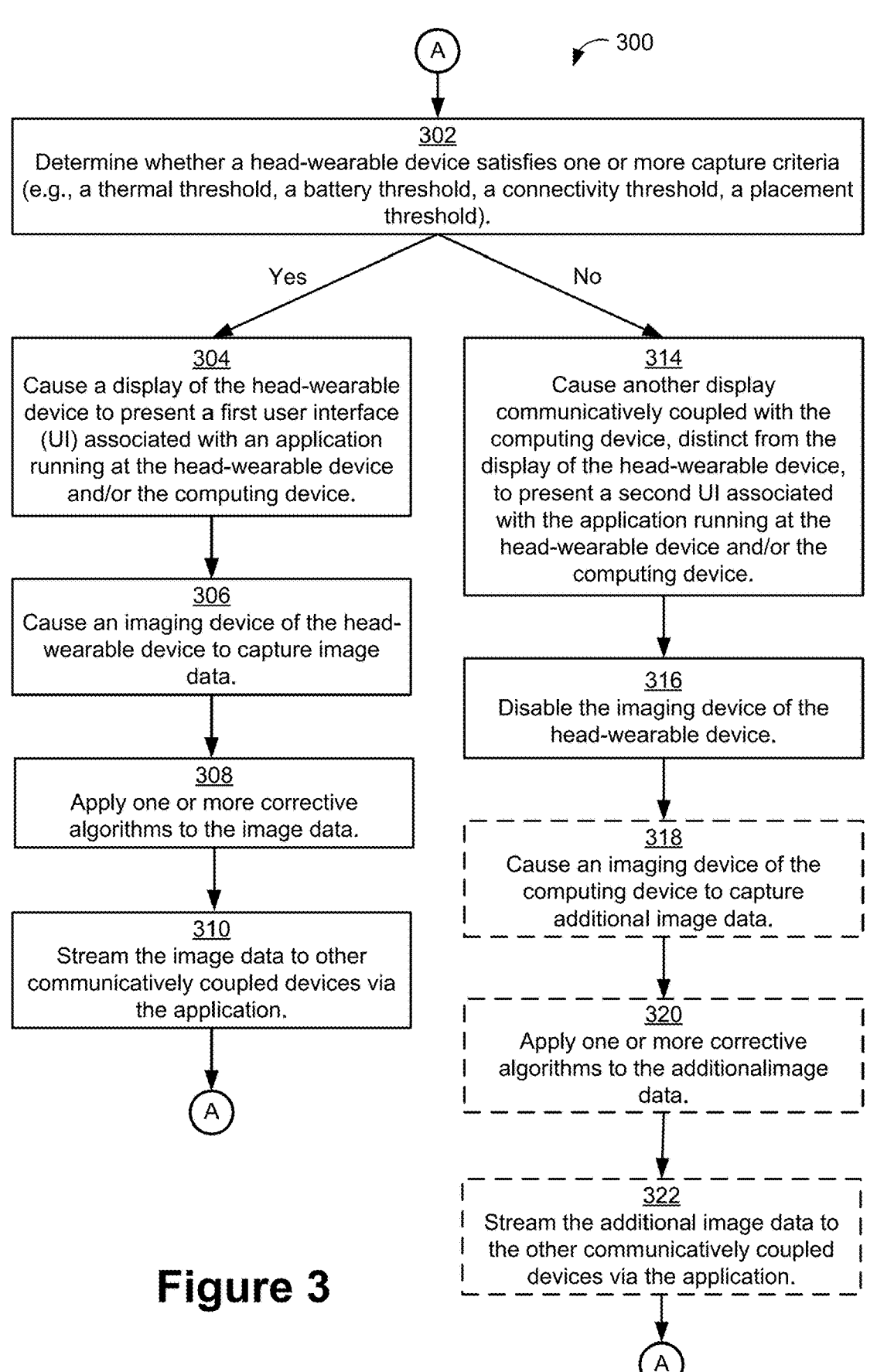
FIG. 3 shows a flow diagram of an example video streaming technique, in accordance with some embodiments.
Figure 7A:
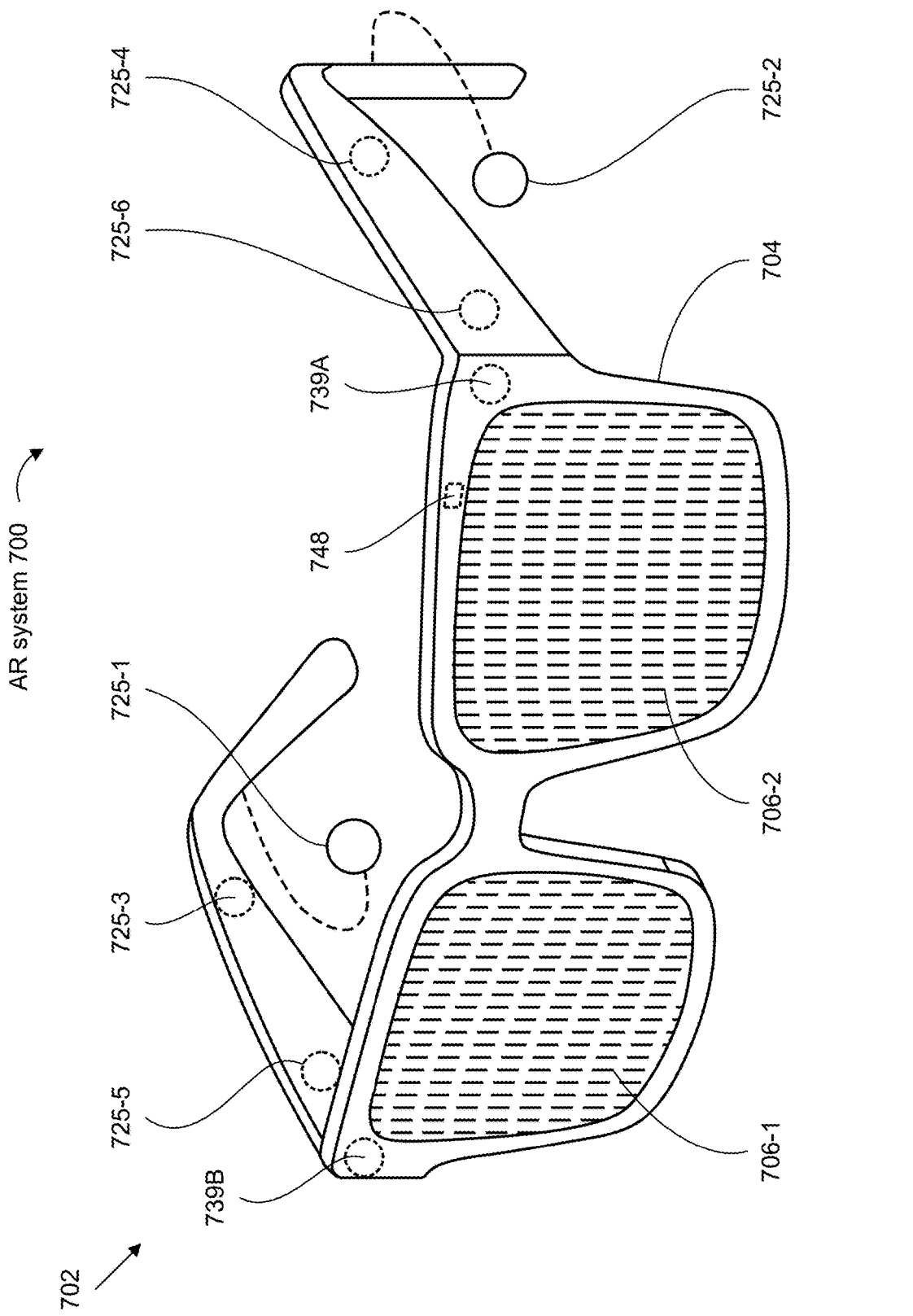
FIGS. 7A-7C illustrate example AR devices in accordance with some embodiments.
Figures 1, 7B:
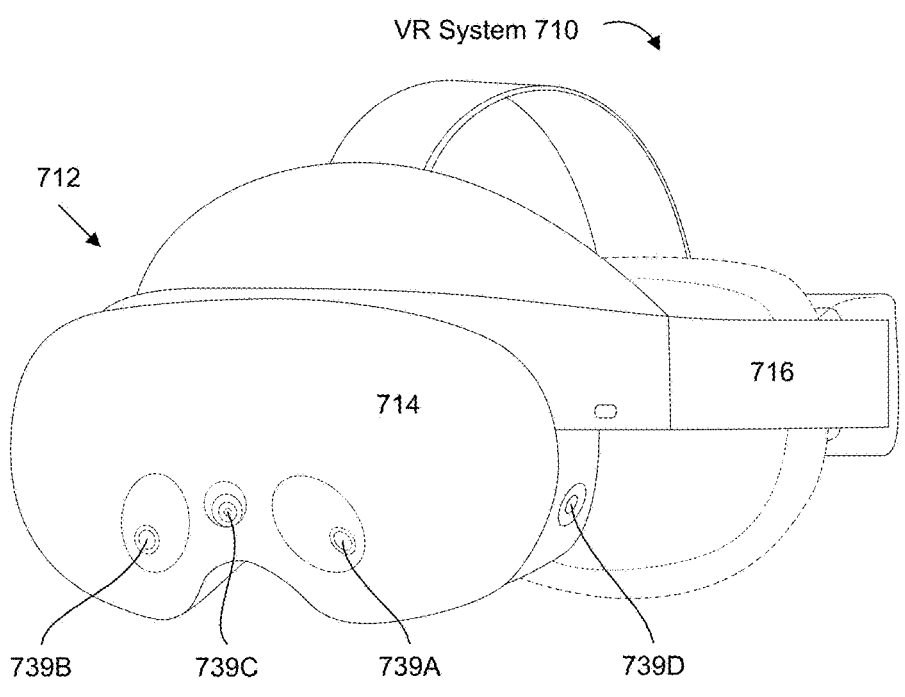
Figures 2, 7B:
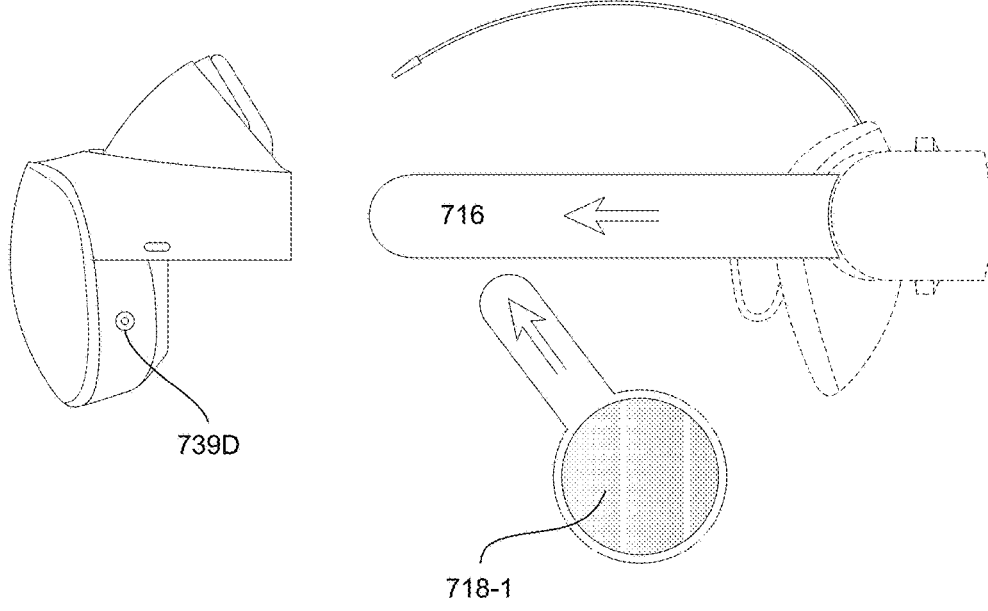

FIGS. 3 and 4 illustrate flow diagrams of methods for performing a livestream using a head-wearable device, in accordance with some embodiments. Operations (e.g., steps) of the methods 300 and 400 can be performed by one or more processors (e.g., central processing unit and/or MCU) of a system (e.g., a head-wearable device 110, an artificial-reality device 700, and/or virtual reality device 710; FIGS. 1A-3 and FIGS. 7A-7C). At least some of the operations shown in FIGS. 3 and 4 correspond to instructions stored in a computer memory or computer-readable storage medium (e.g., storage, RAM, and/or memory 750; 7C). Operations of the methods 300 and 400 can be performed by a single device alone or in conjunction with one or more processors and/or hardware components of another communicatively coupled device (e.g., a wrist-wearable device 195, a hand-held intermediary processing device 800, a server, a computer, a mobile device 190, etc.; FIGS. 7A and 7B) and/or instructions stored in memory or computer-readable medium of the other communicatively coupled device.

Methods 300 and 400 provide techniques for performing a livestream using the head-wearable device 110. Specifically, the methods 300 and 400 are configured to detect when a live stream is initiated and assisting the user in streaming captured image data and/or video data, as well as provide the user with information for conducting the livestream. In some embodiments, the various operations of the methods described herein are interchangeable and/or optional, and respective operations of the methods are performed by any of the aforementioned devices, systems, or combination of devices and/or systems. For convenience, the method operations will be described below as being performed by particular component or device but should not be construed as limiting the performance of the operation to the particular device in all embodiments.

FIG. 3 shows a flow diagram of the example video streaming technique described above with regard to Figured 1A-1F, in accordance with some embodiments. The technique 300 begins with a determination of whether a head-wearable device satisfies one or more capture criteria 302 (e.g., a thermal threshold, a battery threshold, a connectivity threshold, a placement threshold). If the head-wearable device satisfies the one or more capture criteria, a display of the head-wearable device presents a first UI associated with an application running at the head-wearable device and/or the computing device 304. An imaging device of the head-wearable device then captures image data 306. One or more corrective algorithms are the applied to the image data 308. The image data is the streamed to other communicatively coupled devices via the application 310. In some embodiments, the technique then restarts with another determination of whether a head-wearable device satisfies one or more capture criteria.

If the head-wearable device does not satisfy the one or more capture criteria, another display communicatively coupled with the computing device, distinct from the display of the head-wearable device, presents a second UI associated with the application running at the head-wearable device and/or the computing device 314. The imaging device of the head-wearable device is then disabled 316. In some embodiments, an imaging device of the computing device then begins to capture additional image data 318. In some embodiments, one or more corrective algorithms are applied to the additional image data 320. In some embodiments, the additional image data is streamed to the other communicatively coupled devices via the application 322. In some embodiments, the technique then restarts with another determination of whether a head-wearable device satisfies one or more capture criteria.

FIG. 4 shows a flow diagram of a technique for providing audio cues to communicate information to a user of a head-wearable device, in accordance with some embodiments. The technique 400 begins with a determination that the head-wearable device is worn by the user 402. In response to detecting a first event that satisfies a first audio trigger condition of a plurality of audio trigger conditions, cause a speaker communicatively coupled with the head-wearable device to present a first audio cue, the first audio cue including first information corresponding to the first event 404. In response to detecting a second event that satisfies a second audio trigger condition of the plurality of audio trigger conditions, cause the speaker communicatively coupled with the head-wearable device to present a second audio cue, distinct from the first audio cue, the second audio cue including second information corresponding to the second event 406. In some embodiments, the first information and/or the second information includes one or more actions for responding to the first event and/or second event including responding to the interaction provided by the electronic device and/or greeting the user associated with the electronic device. In some embodiments, the first information and/or the second information includes prompting the user for a user input (e.g., via dictation and/or inputs at a communicatively coupled electronic device), and the technique further includes receiving the user input from the user 408.

For example, the first event and/or second event is a received message (e.g., a chat message received via a streaming application), the first audio cue and/or second audio cue is a narration of the message, and the first information and/or second information includes actions for responding to the first event including replying to message (e.g., via dictation and/or inputs at a communicatively coupled electronic device), hiding the message (e.g., on a display of the head-wearable device), dismissing the message, deleting the message, and/or storing the message. As another example, the first event and/or second event is a detection of an electronic device (e.g., a device of a different user) participating in a stream performed, at least in part, by the head-wearable device, the first audio cue and/or second audio cue is an audible pattern (e.g., a chirp, a beep, a tone, a whistle, etc.), and the first information and/or second information includes one or more of a number of participants in the stream, a user associated with the user device (e.g., a username of the user associated with the user device), an interaction (e.g., a message, an emote, an emoticon, etc.) provided by the electronic device, and/or an application used by the electronic device (e.g., Instagram or Facebook). In some embodiments, the electronic device is a first participant of the number of participants, and the first information and/or the second information includes one or more actions for responding to the second event including naming the first participant and/or greeting the first participant. In some embodiments, the electronic device is a last participant of the number of participants, and the first information and/or the second information includes one or more actions for responding to the second event including naming the last participant, sending off the last participant, and/or ending the stream. As another example, the first event and/or second event is a detection that the head-wearable device is no longer worn by the user, the first audio cue and/or second audio cue is another audible pattern (e.g., a chirp, a beep, a tone, a whistle, etc.), and the first information and/or the second information includes requesting that the head-wearable device be repositioned.

Table 1 shows a number of events and corresponding audio cues and information that may be performed at the head-wearable device, in accordance with some embodiments.

| Event | Audio Cue | Information |
|---|---|---|
| Low Battery (15%) | "Battery 15%. Charge your glasses for full functionality." | 15% low battery warning-limits what features are available until the head-wearable device is charged (i.e., video capture) |
| Low Battery (3%) | "Battery 3%. Charge soon." | 3% low battery warning |
| Low Battery (<10%) | "Battery {X} %. Charge soon." | Low battery warning |
| Too Hot Error | "Glasses are hot. To do that, let them cool." | Inform user they cannot use camera (to capture or go live) because the head-wearable device is too hot |
| Too Hot Error | "Glasses too hot. To continue, let them cool." | Head-wearable device is too hot, camera/speakers turning off. |
| Too Hot Error (Shutdown) | "Glasses very hot. Shutting down." | Head-wearable device is too, head-wearable device is shutting down. |
| Bluetooth Connection Warning | "Poor connection. For best results, disconnect other Bluetooth devices." | Inform user of connection downgrade due to poor Bluetooth connection. |
| Bluetooth Disconnected Error | "Bluetooth disconnected. To continue, open the View App and check that your glasses are connected." | Inform user of connection termination due to no Bluetooth connection. |
| Bluetooth Disconnected | "Bluetooth re-connecting. Try again in a few moments." | Informs users Bluetooth is re-connecting |
| Network Disconnected (Start) | "To continue, reconnect your phone to the internet." | No internet connectivity. User has Wi-Fi/data turned off, or has device in airplane mode |
| Network Disconnected | "No service. To continue, check your phones connection and try again." | Internet is disconnected in the middle of a multi turn interaction. |
| Error Resolved | "Glasses ready to resume." | Head-wearable device thermal, connection, or battery have been restored. |
| Activate Video Capture | "Turn on your video to switch to glasses camera." | User should active audio and video capture. |
| Stream Paused | "Your live video is paused." | Audio and Video capture is paused. |
| No Viewers | "Currently no viewers. You'll hear an update when the first viewer joins." | No active viewers or recent comments available. |
| Update Needed | "Open settings to update your glasses." | User must update head-wearable device in Meta View before they can stream. |
| User Reaction | "You got a reaction." | Stream viewer sent a reaction. |
| User Comment | "You got a comment." | Stream viewer sent a comment. |
| Change Camera | "Switched to your glasses camera." | Streaming camera switched to head-wearable device. |
| Phone Locked | "To continue, switch to your phone." | Mobile device is screenlocked. |
| Stream Started | "You're now live!" | Livestream started. |
| Stream Started (Head-Wearable Device) | "Now live from your glasses." | Livestream started from head-wearable device. |
| Stream Ended | "Your live video has ended." | Livestream has ended. |
| Stream Resumed | "Your live video has resumed." | Livestream has resumed. |
| Screen Locked | "You're still live from glasses. Long press the capture button to pause your live video." | Mobile device screenlocks during livestream. |
| First Viewer | "Your first viewer has joined! [Viewer name] is watching." | First viewer has joined livestream. |
| Last Viewer | "[Viewer name] has left. Currently no viewers." | Last person has left livestream. |
| Viewer Count | "You have {viewer_number} viewers." | Number of viewers but no recent comment available. |

-continued

| Event | Audio Cue | Information |
|---|---|---|
| Viewer Count And Comment | "You have {viewer_number} viewers. {viewer_name} said "{comment}"." | Number of viewers and most recent comment. |
| Viewer Count And Long Comment | "You have {viewer_number} viewers. {viewer_name} sent a long comment." | Number of viewers and most recent comment (too long for recitation). |
| Friend Joined | "Your friend has joined! {viewer_name} is watching." | Friend has joined livestream. |
| First Viewer | "Your first viewer has joined!" | First viewer has joined livestream. |
| Last Viewer | "Viewer has left. Currently no viewers." | Last viewer has left livestream. |
| One Viewer | "You have 1 viewer." | One viewer watching livestream. |
| One Viewer Comment | "You have 1 viewer. {viewer_name} said "{comment}"." | One viewer watching livestream has commented. |
| One Viewer Comment | "You have 1 viewer. They said "{comment}"." | One viewer watching livestream has commented. |
| One Viewer Comment | "You have 1 viewer. {viewer_name} sent a comment." | One viewer watching livestream has commented. |
| One Viewer Long Comment | "You have 1 viewer. {viewer_name} sent a long comment." | One viewer watching livestream has commented (too long for recitation). |
| One Viewer Comment | "You have 1 viewer. They sent a comment." | One viewer watching livestream has commented. |
| One Viewer Long Comment | "You have 1 viewer. They sent a long comment." | One viewer watching livestream has commented (too long for recitation). |
| Viewer Count And New Comment | "You have {viewer_number} viewers. {viewer_name} sent a comment." | Multiple viewers watching livestream and new viewer comment has been made. |
| Viewer Count And New Comment | "You have {viewer_number} viewers. A viewer said "{comment}"." | Multiple viewers watching livestream and new viewer comment has been made. |
| Viewer Count And New Comment | "You have {viewer_number} viewers. A viewer sent a comment." | Multiple viewers watching livestream and new viewer comment has been made. |
| Viewer Count And New Long Comment | "You have {viewer_number} viewers. A viewer sent a long comment." | Multiple viewers watching livestream and new viewer comment has been made (too long for recitation). |
| Friend Joined | "Your friend has joined!" | Friend has joined the livestream. |
| New Viewer | "[Viewer name] is watching." | A new viewer has joined the livestream. |
| New Viewer | "A viewer has joined." | A new viewer has joined the livestream. |
| Battery Low Prevention | "Battery {X} %. To do that, charge your glasses." | User prevented from going live because of low battery. |
| LED Blocked | "The Capture LED is blocked. Unblock the front of the glasses to use the camera." | Inform user they cannot use camera (to preview or go live) because capture LED is covered. |
| Network Error | "Video paused; your glasses are disconnected. Switch to your phone camera now." | Head-wearable device have no network connection. |
| LED Blocked | "Live video paused; the capture LED is blocked. To continue, switch to your phone." | Inform user their livestream from head-wearable device is paused because the Bystander light/capture LED is covered. |
| Stream Starting | "Your live video is starting." | Livestream is initiating. |
| Stream Countdown | "Going live in 3 . . . 2 . . . 1 . . . " | Countdown before livestream begins. |
| Switch Cameras (Thermal Error) | "Video paused; your glasses are too hot. Switch to your phone camera now." | Head-wearable device is too hot, so camera is turning off. Stream is paused. User can switch to their mobile device camera. |
| Switch Cameras (Connectivity Error) | "Video paused; your glasses are disconnected. Switch to your phone camera now." | Network connection is lost. Stream is paused. User can switch to their mobile device camera. |
| Switch Cameras (Battery Error) | "Video paused. Glasses shutting down." | Head-wearable device battery is dead. Stream is paused. User can switch to their mobile device camera. |
| Pause Stream (Thermal Error) | "Glasses too hot. To continue, let them cool down." | Head-wearable device is too hot, so camera is turning off. Stream is paused. |

-continued

| Event | Audio Cue | Information |
|-------|-----------|-------------|
| Pause Stream (Connectivity Error) | "Glasses disconnected. To continue, reconnect to your phone." | Network connection is lost. Stream is paused. |
| Camera Blocked | "Your glasses camera's blocked." | Video is occluded by foreign object (e.g., hat or hair). |

(A1) In accordance with some embodiments, a non-transitory computer readable storage medium includes instructions that, when executed by a head-wearable device (e.g., the head-wearable device 110 illustrated in FIGS. 1A-1F) and/or a computing device (e.g., the computing device 190 illustrated as a mobile device in FIGS. 1A-1F), cause the head-wearable device 110 and/or the computing device 190 to perform the following actions while a head-wearable device 110 and a computing device 190 are communicatively coupled. (1) In accordance with a determination, at a first point in time, that the head-wearable device 110 satisfies one or more capture criteria (e.g., a battery threshold, a thermal threshold, and/or a connectivity threshold), the head-wearable device 110 and/or the computing device 190: (i) cause a display (e.g., the display 112 illustrated in FIGS. 1A-IE) of the head-wearable device 110 to present a first UI associated with an application (e.g., as illustrated in FIGS. 1A-1D) running at the head-wearable device 110 and/or the computing device 190, (ii) cause an imaging device (e.g., the imaging device 111 illustrated in FIGS. 1A-IE) of the head-wearable device 110 to capture image data, and (iii) stream the image data to other communicatively coupled devices (e.g., the other communicatively coupled devices 290 illustrated in FIG. 2) via the application (e.g., running on the other communicatively coupled devices). (2) In accordance with a determination, at a second point in time, that the head-wearable device 110 does not satisfy one or more capture criteria, the head-wearable device 110 and/or the computing device 190: (i) cause another display communicatively coupled with the computing device (e.g., the other display 192 illustrated in Figures IE-1F), distinct from the display 112 of the head-wearable device 110, to present a second UI associated with the application (e.g., as illustrated in Figures IE-1F) running at the head-wearable device 110 and/or the computing device 190, and (ii) disable the imaging device 112 of the head-wearable device 110.

(A2) In some embodiments of A1, the instructions, when executed by the head-wearable device 110 and/or the computing device 190, further cause the head-wearable device 110 and/or the computing device 190 to, in accordance with a determination, at the second point in time, that the head-wearable device 110 does not satisfy one or more capture criteria: (i) cause an imaging device 112 of the computing device 110 to capture additional image data, and (ii) stream the additional image data to other communicatively coupled devices 290 via the application (e.g., running on the other communicatively coupled devices).

(A3) In some embodiments of A1-A2, the instructions, when executed by the head-wearable device 110 and/or the computing device 190, further cause the head-wearable device 110 and/or the computing device 190 to wait a predefined amount of time (e.g., five minutes) before disabling the imaging device 112 of the head-wearable device 110.

(A4) In some embodiments of A1-A3, the second UI includes suggestions for satisfying one or more capture criteria.

(A5) In some embodiments of A1-A4, the one or more capture criteria include one or more head-wearable device specific thresholds including a thermal threshold, a battery threshold (e.g., as illustrated in FIG. 1E), a connectivity threshold, and a placement threshold (e.g., whether the head-wearable device is located on the user's head).

(A6) In some embodiments of A1-A5, the thermal threshold includes a predefined temperature value (e.g., a maximum temperature).

(A7) In some embodiments of A1-A6, the battery threshold includes a predefined battery percentage (e.g., a minimum battery percentage).

(A8) In some embodiments of A1-A7, the connectivity threshold includes a predefined signal strength (e.g., a minimum signal strength).

(A9) In some embodiments of A1-A8, the placement threshold includes one or more of predefined capacitive values (e.g., a minimum capacitive value detected by a capacitive sensor) for each temple arm of the head-wearable device and/or a predefined distance values (e.g., a minimum distance value detected by a proximity senser) for each temple arm of the head-wearable device.

(A10) In some embodiments of A1-A9, streaming image data to the other communicatively coupled devices 290 via the application includes causing the application to present an attribution UI element (e.g., a chat message or emblem indicating that the capture was done at the head-wearable device, wherein selection of the attribution can cause a store page or a website associated with the head-wearable device to open).

(A11) In some embodiments of A1-A10, the second UI is presented as part of a mobile application, web application, or streaming platform running on the communicatively coupled device 290.

(A12) In some embodiments of A1-A11, the first UI and the second UI are the same.

(A13) In some embodiments of A1-A12, the first UI and the second UI include one or more UI elements (e.g., the microphone indicator 132 and the camera indicator 133 illustrated in FIGS. 1B-1F) indicating that a microphone communicatively coupled with the head-wearable device 110 and/or the imaging device 111 of the head-wearable device 110 are active.

(A14) In some embodiments of A1-A13, streaming the image data to other communicatively coupled devices 290 via the application includes: (i) providing (e.g., encoding and transmitting) the image data to the computing device 190 (e.g., via the application), and (ii) transmitting, via the computing device 190, the image data to the other communicatively coupled devices 290 (e.g., the computing device decodes, processes, and encodes the image data before transmitting the image data).

(A15) In some embodiments of A1-A14, the head-wearable device 110 provides the image data to the computing device 190 via Bluetooth.

(A16) In some embodiments of A1-A15, the instructions, when executed by the head-wearable device 110 and/or the computing device 190, further cause the head-wearable device 110 and/or the computing device 190 to, before providing the image data to the computing device 190, receive, from the computing device 190, one or more parameters for encoding the image data by the head-wearable device 110.

(A17) In some embodiments of A1-A16, the instructions, when executed by the head-wearable device 110 and/or the computing device 190, further cause the head-wearable device 110 and/or the computing device 190 to, before transmitting, via the computing device 190, the image data to the other communicatively coupled devices 290, present via a display (e.g., the display 112 and the other display 192 illustrated in FIGS. 1A-1F) communicatively coupled with the computing device 190 a preview of the image data.

(A18) In some embodiments of A1-A17, the instructions, when executed by the head-wearable device 110 and/or the computing device 190, further cause the head-wearable device 110 and/or the computing device 190 to (i), before streaming the image data to the other communicatively coupled devices 190, apply one or more corrective algorithms to the image data (e.g., a de-warping algorithm and/or an Electronic Image Stabilization algorithm), and (ii) transmit, via the computing device 190, the image data to the other communicatively coupled devices 290 (e.g., the computing device decodes, processes, and encodes the image data before transmitting the image data).

(A19) In some embodiments of A1-A18, the instructions, when executed by the head-wearable device 110 and/or the computing device 190, further cause the head-wearable device 110 and/or the computing device 190 to, while streaming the image data, (i) receive via the application one or more engagement events corresponding to the image data, and (ii) presenting via the display 112 of the head-wearable device 110 and/or the other display 192 communicatively coupled with the computing device 190, the one or more engagement events. (e.g., chat messages, emotes, emojis, emoticons, etc. as illustrated in FIGS. 1C-1D).

(A20) In some embodiments of A1-A19, the first UI includes one or more icons presented at the head-wearable device. (e.g., the camera icon 133, the microphone icon 132, etc. as illustrated in FIGS. 1B-1D).

(B1) In accordance with some embodiments, a system that includes a head-wearable device, a computing device, and/or at least one other communicatively coupled devices, and the system is configured to execute the instructions corresponding to any of A1-A20.

(C1) In accordance with some embodiments, a method of operating a head-wearable device, a computing device, and/or at least one other communicatively coupled devices including operations that correspond to any of A1-A20.

(D1) In accordance with some embodiments, a non-transitory computer readable storage medium includes instructions that, when executed by a head-wearable device, cause the head-wearable device to, while a head-wearable device is worn by a user, (i) in response to detecting a first event (e.g., a viewer entering a livestream as illustrated in FIG. 1C) that satisfies a first audio trigger condition of a plurality of audio trigger conditions, cause a speaker communicatively coupled with the head-wearable device to present a first audio cue (e.g., reciting "Jojobobo has entered the chat" 142 as illustrated in FIG. 1C), the first audio cue

142 including first information corresponding to the first event, and (ii) in response to detecting a second event (e.g., a viewer commenting in a livestream as illustrated in FIG. 1D) that satisfies a second audio trigger condition of the plurality of audio trigger conditions, cause the speaker communicatively coupled with the head-wearable device to present a second audio cue (e.g., reciting "Jojobobo says: Hi everyone!" 143 as illustrated in FIG. 1D), distinct from the first audio cue 142, the second audio cue 143 including second information corresponding to the second event.

(D2) In some embodiments of D1, the first event is a received message, the first audio cue is a narration of the message, and the first information includes actions for responding to the first event including one or more of replying to the message (e.g., dictation), hiding the message, dismissing the message, deleting the message, and storing the message (e.g., as illustrated in FIG. 1D).

(D3) In some embodiments of D1-D2, the second event is detection of an electronic device participating in a stream performed, in part, by the head-wearable device, the second audio cue is an audible pattern (e.g., a chirp, a beep, a tone, a whistle, etc.), and the second information includes one or more of a number of participants in the stream, a user associated with the user device, an interaction (e.g., a message, an emote, an emoticon, etc.) provided by the electronic device, and an application used by the electronic device (e.g., Instagram and/or Facebook) (e.g., as illustrated in FIG. 1C).

(D4) In some embodiments of D1-D3, the second information includes one or more actions for responding to the second event including one or more of responding to the interaction provided by the electronic device and greeting the user associated with the electronic device.

(D5) In some embodiments of D1-D4, the electronic device participating in the stream is the first participant, and the second information includes one or more actions for responding to the second event including naming the first participant and/or greeting first participant.

(D6) In some embodiments of D1-D5, the electronic device participating in the stream is the last participant, and the second information includes one or more actions for responding to the second event including naming the last participant, sending off the last participant, and/or ending the stream.

(D7) In some embodiments of D1-D6, the first event is detection that the head-wearable device is no longer worn, the first audio cue is an audible pattern, (e.g., a chirp, a beep, a tone, a whistle, etc.), and the first information includes one or more of requesting that the head-wearable device be repositioned.

(D8) In some embodiments of D1-D7, the first information includes one or more of requesting that the user perform a user input, and the instructions, when executed by a head-wearable device, further cause the head-wearable device, while a head-wearable device is worn by a user, to detect the user input.

(D9) In some embodiments of D1-D8, the first event is detection that a battery of the head-wearable device is at a threshold battery level, the first audio cue is an audible pattern, and the first information includes one or more of requesting that the head-wearable device be charged and features of the head-wearable device that are disabled.

(D10) In some embodiments of D1-D9, the first event is detection that a temperature of the head-wearable device is a temperature threshold, the first audio cue is an audible pattern, and the first information includes one or more of features of the head-wearable device that are disabled.

(D11) In some embodiments of D1-D10, the first event is detection that a camera of the head-wearable device is covered, the first audio cue is an audible pattern, and the first information includes one or more of features of requesting that the camera of the head-wearable device be unblocked.

(E1) In accordance with some embodiments, a system that includes a head-wearable device, and the system is configured to execute the instructions corresponding to any of D1-D11.

(F1) In accordance with some embodiments, a method of operating a head-wearable device including operations that correspond to any of D1-D11.

The devices described above are further detailed below, including wrist-wearable devices, headset devices, systems, and haptic feedback devices. Specific operations described above may occur as a result of specific hardware, such hardware is described in further detail below. The devices described below are not limiting and features on these devices can be removed or additional features can be added to these devices.

Example AR Systems 5A-5C-2

Figure 5A:
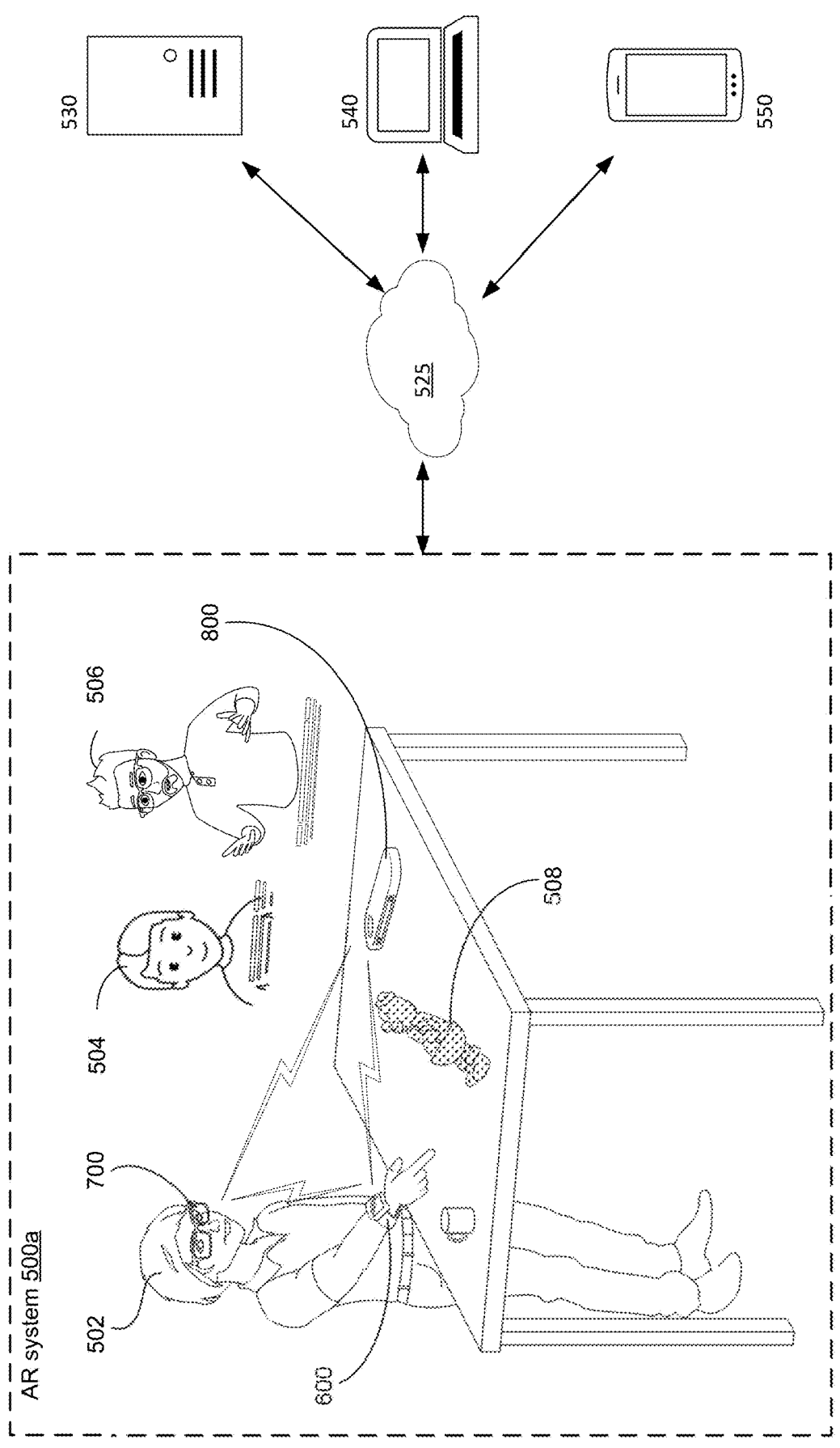
Figure 5B:
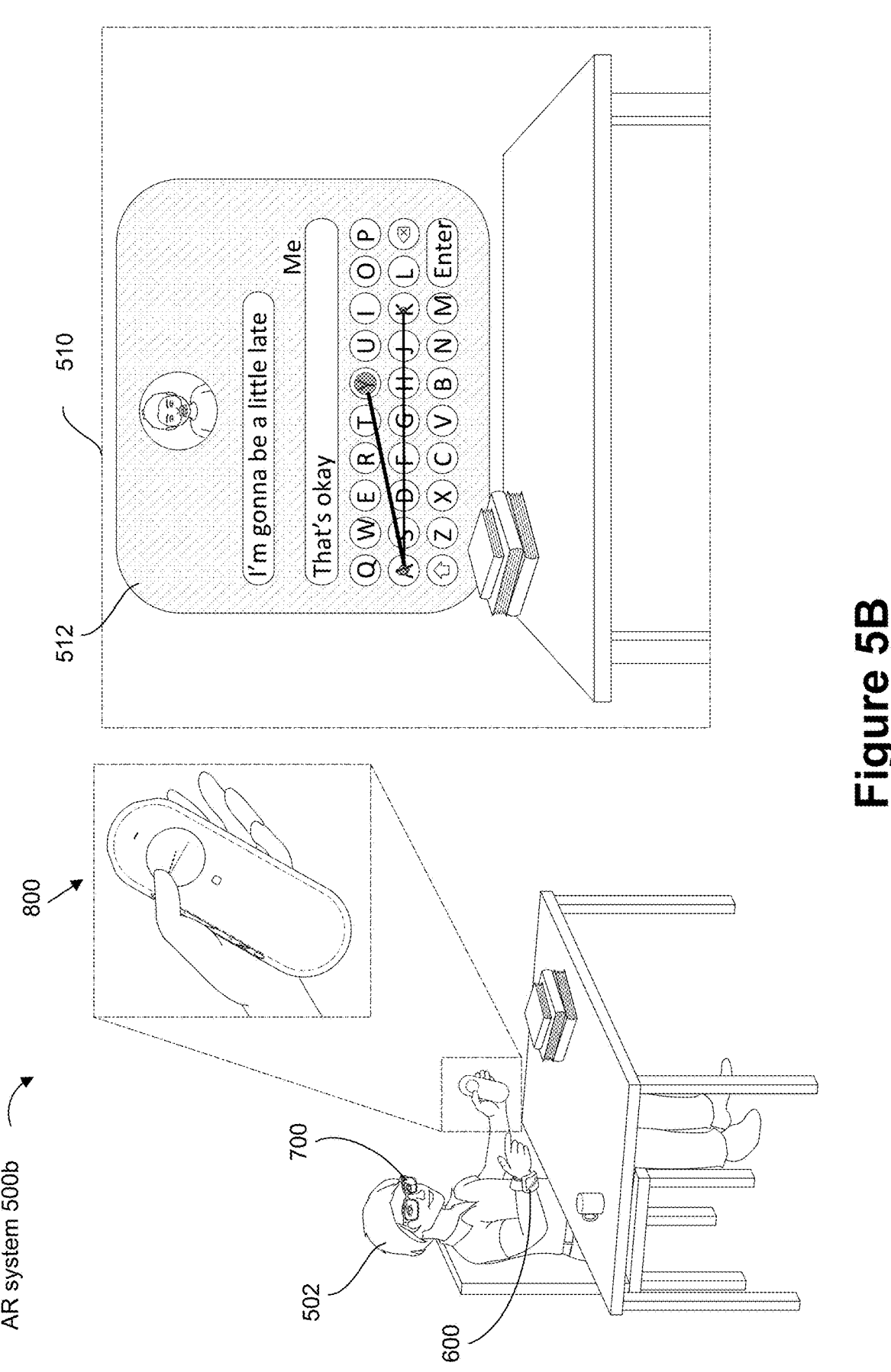
Figures 1, 5C:
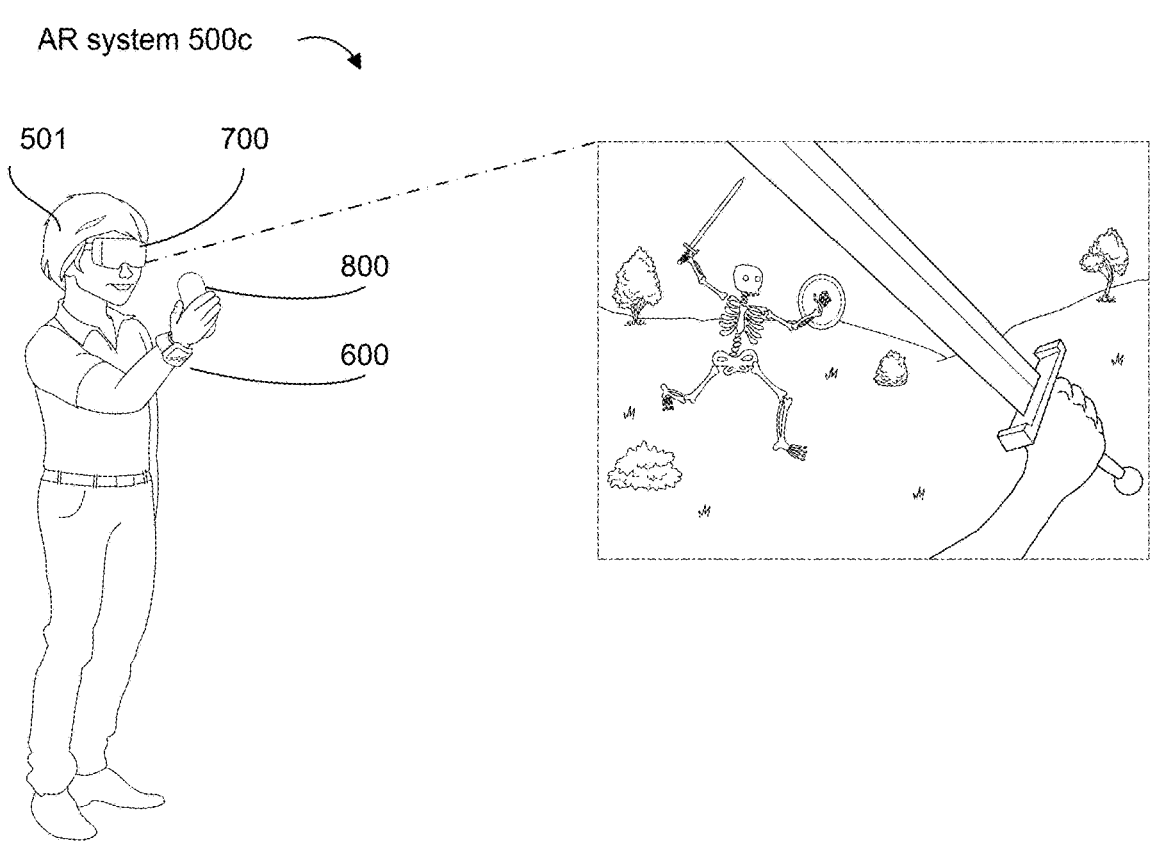
Figures 2, 5C:
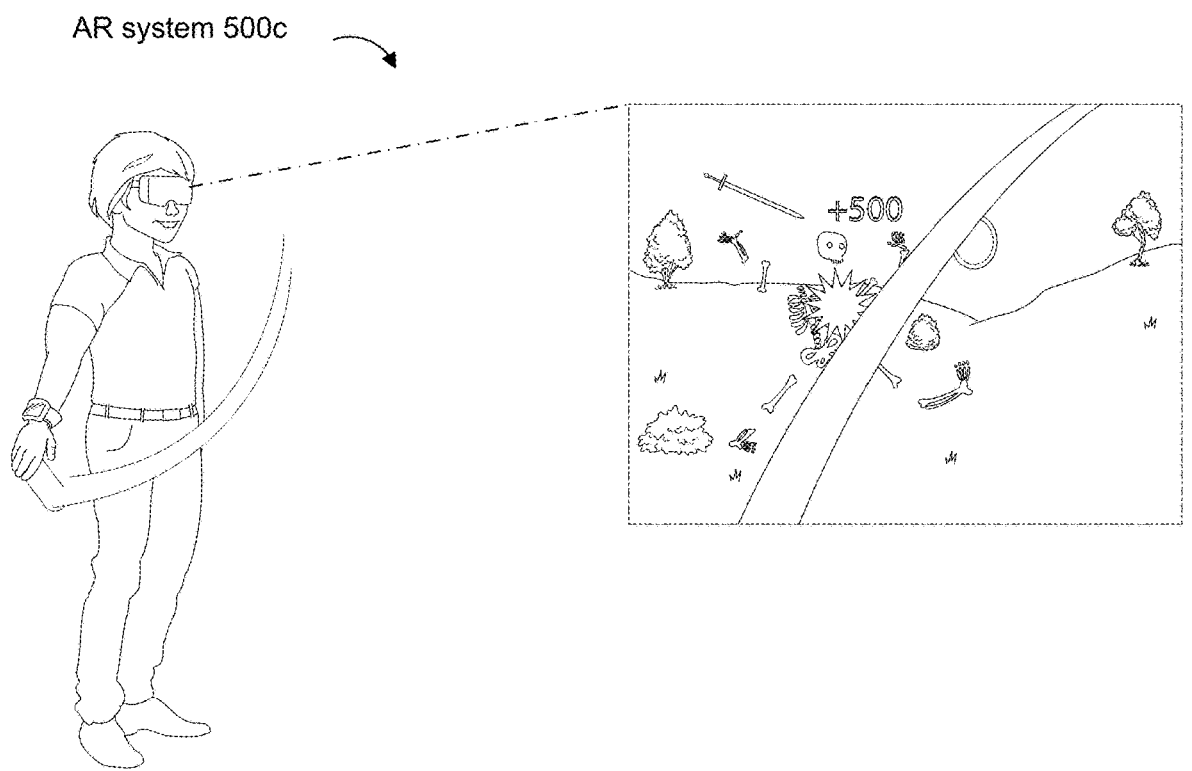

FIGS. 5A-5C-2 illustrate example artificial-reality (AR) systems, in accordance with some embodiments. FIG. 5A shows a first AR system 500*a* and first example user interactions using a wrist-wearable device 600, a head-wearable device (e.g., AR glasses 700), and/or a handheld intermediary processing device (HIPD) 800. FIG. 5B shows a second AR system 500*b* and second example user interactions using a wrist-wearable device 600, AR glasses 700, and/or an HIPD 800. FIGS. 5C-1 and 5C-2 show a third AR system 500*c* and third example user interactions using a wrist-wearable device 600, a head-wearable device (e.g., VR headset 750), and/or an HIPD 800. As the skilled artisan will appreciate upon reading the descriptions provided herein, the above-example AR systems (described in detail below) can perform various functions and/or operations described above with reference to FIGS. 1A-4.

The wrist-wearable device 600 and one or more of its components are described below in reference to FIGS. 6A-6B; the head-wearable devices and their one or more components are described below in reference to FIGS. 7A-7D; and the HIPD 800 and its one or more components are described below in reference to FIGS. 8A-8B. The wrist-wearable device 600, the head-wearable devices, and/or the HIPD 800 can communicatively couple via a network 525 (e.g., cellular, near field, Wi-Fi, personal area network, wireless LAN, etc.). Additionally, the wrist-wearable device 600, the head-wearable devices, and/or the HIPD 800 can also communicatively couple with one or more servers 530, computers 540 (e.g., laptops, computers, etc.), mobile devices 550 (e.g., smartphones, tablets, etc.), and/or other electronic devices via the network 525 (e.g., cellular, near field, Wi-Fi, personal area network, wireless LAN, etc.).

Turning to FIG. 5A, a user 502 is shown wearing the wrist-wearable device 600 and the AR glasses 800 and having the HIPD 800 on their desk. The wrist-wearable device 600, the AR glasses 800, and the HIPD 800 facilitate user interaction with an AR environment. In particular, as shown by the first AR system 500*a*, the wrist-wearable device 600, the AR glasses 800, and/or the HIPD 800 cause presentation of one or more avatars 504, digital representations of contacts 506, and virtual objects 508. As discussed below, the user 502 can interact with the one or more avatars 504, digital representations of the contacts 506, and virtual objects 508 via the wrist-wearable device 600, the AR glasses 800, and/or the HIPD 800.

The user 502 can use any of the wrist-wearable device 600, the AR glasses 7, and/or the HIPD 800 to provide user inputs. For example, the user 502 can perform one or more hand gestures that are detected by the wrist-wearable device 600 (e.g., using one or more EMG sensors and/or IMUs, described below in reference to FIGS. 6A-6B) and/or AR glasses 700 (e.g., using one or more image sensor or camera, described below in reference to FIGS. 7A-7B) to provide a user input. Alternatively, or additionally, the user 502 can provide a user input via one or more touch surfaces of the wrist-wearable device 600, the AR glasses 700, and/or the HIPD 800, and/or voice commands captured by a microphone of the wrist-wearable device 600, the AR glasses 700, and/or the HIPD 800. In some embodiments, the wrist-wearable device 600, the AR glasses 700, and/or the HIPD 800 include a digital assistant to help the user in providing a user input (e.g., completing a sequence of operations, suggesting different operations or commands, providing reminders, confirming a command, etc.). In some embodiments, the user 502 can provide a user input via one or more facial gestures and/or facial expressions. For example, cameras of the wrist-wearable device 600, the AR glasses 700, and/or the HIPD 800 can track the user 502's eyes for navigating a user interface.

The wrist-wearable device 600, the AR glasses 800, and/or the HIPD 800 can operate alone or in conjunction to allow the user 502 to interact with the AR environment. In some embodiments, the HIPD 800 is configured to operate as a central hub or control center for the wrist-wearable device 600, the AR glasses 700, and/or another communicatively coupled device. For example, the user 602 can provide an input to interact with the AR environment at any of the wrist-wearable device 600, the AR glasses 700, and/or the HIPD 800, and the HIPD 800 can identify one or more back-end and front-end tasks to cause the performance of the requested interaction and distribute instructions to cause the performance of the one or more back-end and front-end tasks at the wrist-wearable device 600, the AR glasses 700, and/or the HIPD 800. In some embodiments, a back-end task is background processing task that is not perceptible by the user (e.g., rendering content, decompression, compression, etc.), and a front-end task is a user-facing task that is perceptible to the user (e.g., presenting information to the user, providing feedback to the user, etc.)). As described below in reference to FIGS. 8A-8B, the HIPD 800 can perform the back-end tasks and provide the wrist-wearable device 600 and/or the AR glasses 700 operational data corresponding to the performed back-end tasks such that the wrist-wearable device 600 and/or the AR glasses 700 can perform the front-end tasks. In this way, the HIPD 800, which has more computational resources and greater thermal headroom than the wrist-wearable device 600 and/or the AR glasses 700, performs computationally intensive tasks and reduces the computer resource utilization and/or power usage of the wrist-wearable device 600 and/or the AR glasses 700.

In the example shown by the first AR system 500*a*, the HIPD 800 identifies one or more back-end tasks and front-end tasks associated with a user request to initiate an AR video call with one or more other users (represented by the avatar 504 and the digital representation of the contact 506) and distributes instructions to cause the performance of the one or more back-end tasks and front-end tasks. In particular, the HIPD 800 performs back-end tasks for processing and/or rendering image data (and other data) associated with the AR video call and provides operational data associated with the performed back-end tasks to the AR glasses 700 such that the AR glasses 700 perform front-end tasks for presenting the AR video call (e.g., presenting the avatar 504 and the digital representation of the contact 506).

In some embodiments, the HIPD 800 can operate as a focal or anchor point for causing the presentation of information. This allows the user 502 to be generally aware of where information is presented. For example, as shown in the first AR system 500a, the avatar 504 and the digital representation of the contact 506 are presented above the HIPD 800. In particular, the HIPD 800 and the AR glasses 700 operate in conjunction to determine a location for presenting the avatar 504 and the digital representation of the contact 506. In some embodiments, information can be presented a predetermined distance from the HIPD 800 (e.g., within 5 meters). For example, as shown in the first AR system 500a, virtual object 508 is presented on the desk some distance from the HIPD 800. Similar to the above example, the HIPD 800 and the AR glasses 700 can operate in conjunction to determine a location for presenting the virtual object 508. Alternatively, in some embodiments, presentation of information is not bound by the HIPD 800. More specifically, the avatar 504, the digital representation of the contact 506, and the virtual object 508 do not have to be presented within a predetermined distance of the HIPD 800.

User inputs provided at the wrist-wearable device 600, the AR glasses 7, and/or the HIPD 800 are coordinated such that the user can use any device to initiate, continue, and/or complete an operation. For example, the user 502 can provide a user input to the AR glasses 7 to cause the AR glasses 7 to present the virtual object 508 and, while the virtual object 508 is presented by the AR glasses 7, the user 502 can provide one or more hand gestures via the wrist-wearable device 600 to interact and/or manipulate the virtual object 508.

FIG. 5B shows the user 502 wearing the wrist-wearable device 600 and the AR glasses 800 and holding the HIPD 800. In the second AR system 500b, the wrist-wearable device 600, the AR glasses 800, and/or the HIPD 800 are used to receive and/or provide one or more messages to a contact of the user 502. In particular, the wrist-wearable device 600, the AR glasses 800, and/or the HIPD 800 detect and coordinate one or more user inputs to initiate a messaging application and prepare a response to a received message via the messaging application.

In some embodiments, the user 502 initiates, via a user input, an application on the wrist-wearable device 600, the AR glasses 800, and/or the HIPD 800 that causes the application to initiate on at least one device. For example, in the second AR system 500b the user 502 performs a hand gesture associated with a command for initiating a messaging application (represented by messaging user interface 512); the wrist-wearable device 600 detects the hand gesture; and, based on a determination that the user 502 is wearing AR glasses 700, causes the AR glasses 700 to present a messaging user interface 512 of the messaging application. The AR glasses 700 can present the messaging user interface 512 to the user 502 via its display (e.g., as shown by user 502's field of view 510). In some embodiments, the application is initiated and ran on the device (e.g., the wrist-wearable device 600, the AR glasses 800, and/or the HIPD 800) that detects the user input to initiate the application, and the device provides another device operational data to cause the presentation of the messaging application. For example, the wrist-wearable device 600 can detect the user input to initiate a messaging application; initiate and run the messaging application; and provide operational data to the AR glasses 700 and/or the HIPD 800 to cause presentation of the messaging application. Alternatively, the application can be initiated and ran at a device other than the device that detected the user input. For example, the wrist-wearable device 600 can detect the hand gesture associated with initiating the messaging application and cause the HIPD 800 to run the messaging application and coordinate the presentation of the messaging application.

Further, the user 502 can provide a user input provided at the wrist-wearable device 600, the AR glasses 7, and/or the HIPD 800 to continue and/or complete an operation initiated are at another device. For example, after initiating the messaging application via the wrist-wearable device 600 and while the AR glasses 7 present the messaging user interface 512, the user 502 can provide an input at the HIPD 800 to prepare a response (e.g., shown by the swipe gesture performed on the HIPD 800). The user 502's gestures performed on the HIPD 800 can be provided and/or displayed on another device. For example, the user 502's swipe gestured performed on the HIPD 800 are displayed on a virtual keyboard of the messaging user interface 512 displayed by the AR glasses 7.

In some embodiments, the wrist-wearable device 600, the AR glasses 800, the HIPD 800, and/or other communicatively couple device can present one or more notifications to the user 502. The notification can be an indication of a new message, an incoming call, an application update, a status update, etc. The user 502 can select the notification via the wrist-wearable device 600, the AR glasses 800, the HIPD 800, and cause presentation of an application or operation associated with the notification on at least one device. For example, the user 502 can receive a notification that a message was received at the wrist-wearable device 600, the AR glasses 800, the HIPD 800, and/or other communicatively couple device and provide a user input at the wrist-wearable device 600, the AR glasses 800, and/or the HIPD 800 to review the notification, and the device detecting the user input can cause an application associated with the notification to be initiated and/or presented at the wrist-wearable device 600, the AR glasses 800, and/or the HIPD 800.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR glasses 800 can present to the user 502 game application data and the HIPD 800 can use a controller to provide inputs to the game. Similarly, the user 502 can use the wrist-wearable device 600 to initiate a camera of the AR glasses 800, and the user can use the wrist-wearable device 600, the AR glasses 800, and/or the HIPD 800 to manipulate the image capture (e.g., zoom in or out, apply filters, etc.) and capture image data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

As described herein, a processor (e.g., a central processing unit (CPU)), is an electronic component that is responsible for executing instructions and controlling the operation of an electronic device (e.g., a computer). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing, and/or can be customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, memory refers to electronic components in a computer or electronic device that store data and instructions for the processor to access and manipulate. Examples of memory can include: (i) random access memory (RAM) configured to store data and instructions temporarily; (ii) read-only memory (ROM) configured to store data and instructions permanently (e.g., one or more portions of system firmware, and/or boot loaders); (iii) flash memory, which can be configured to store data in electronic devices (e.g., USB drives, memory cards, and/or solid-state drives (SSDs); and (iv) cache memory configured to temporarily store frequently accessed data and instructions. Memory, as described herein, can include structured data (e.g., SQL databases, MongoDB databases, GraphQL data, JSON data, etc.). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) which may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include: (i) universal serial bus (USB) and/or micro-USB interfaces configured for connecting devices to an electronic device; (ii) bluetooth interfaces configured to allow devices to communicate with each other, including bluetooth low energy (BLE); (iii) near field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) WiFi interfaces for providing a connection between a device and a wireless network; (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can includer: (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface); light sensors (e.g., time-of-flight sensors, infrared light sensors, visible light sensors, etc.); . . . . As described herein biopotential-signal-sensing components are are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and to diagnose neuromuscular disorders; (iv) electrooculography (EOG) sensors configure to measure the electrical activity of eye muscles to detect eye movement and diagnose eye disorders.

As described herein, an application stored in memory of an electronic device (e.g., software) includes instructions stored in the memory. Examples of such applications include: (i) games; (ii) word processors; messaging applications; media-streaming applications; financial applications; calendars; clocks; communication interface modules for enabling wired and/or wireless connections between different respective electronic devices (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocols);

As described herein, a communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs), protocols like HTTP and TCP/IP, etc.).

As described herein, a graphics module is a component or software module that is designed to handle graphical operations and/or processes and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified.

Example Wrist-Wearable Devices

Figure 6A:
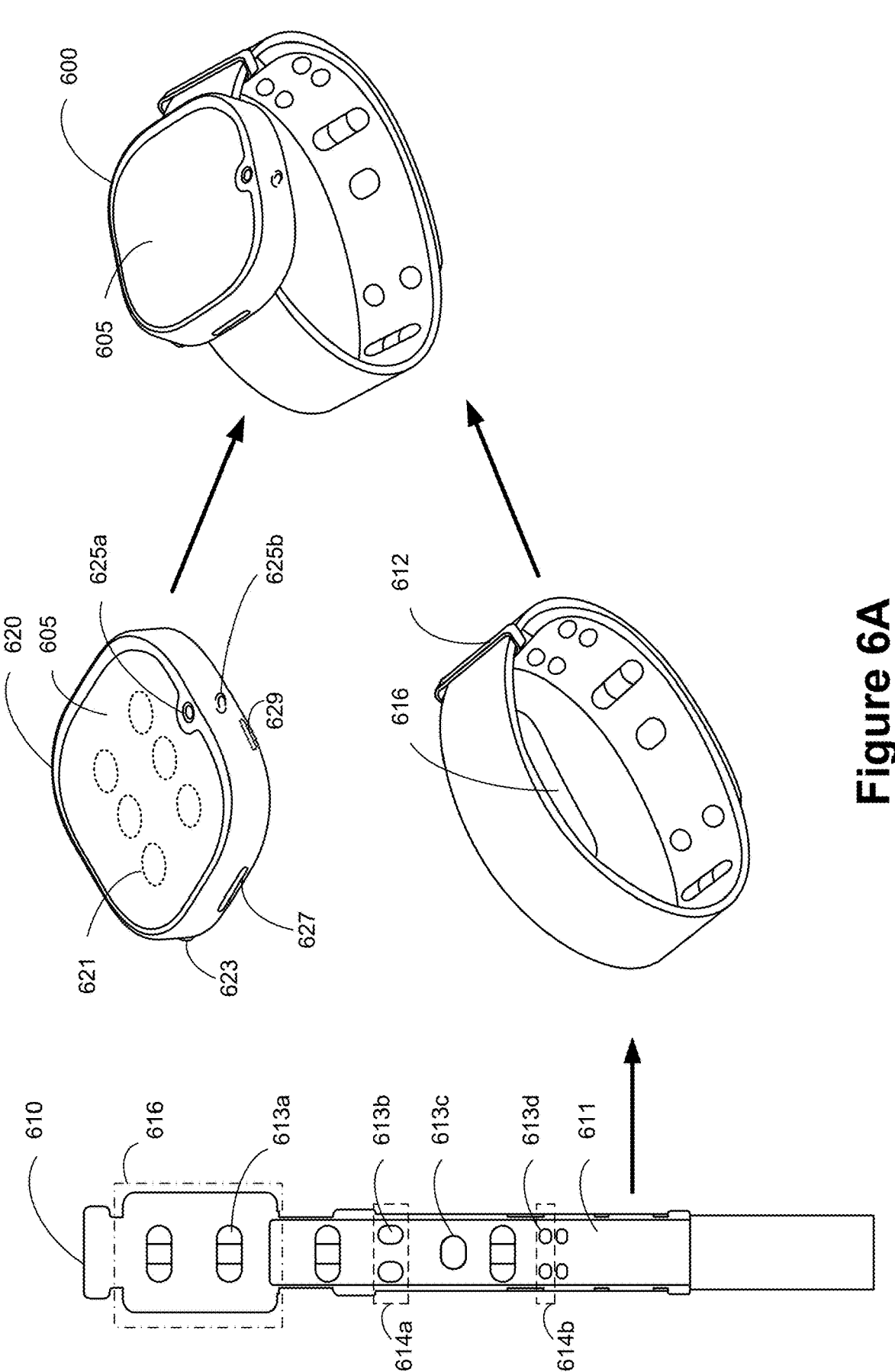
FIGS. 6A-6B illustrate an example wrist-wearable device, in accordance with some embodiments.
Figure 6B:
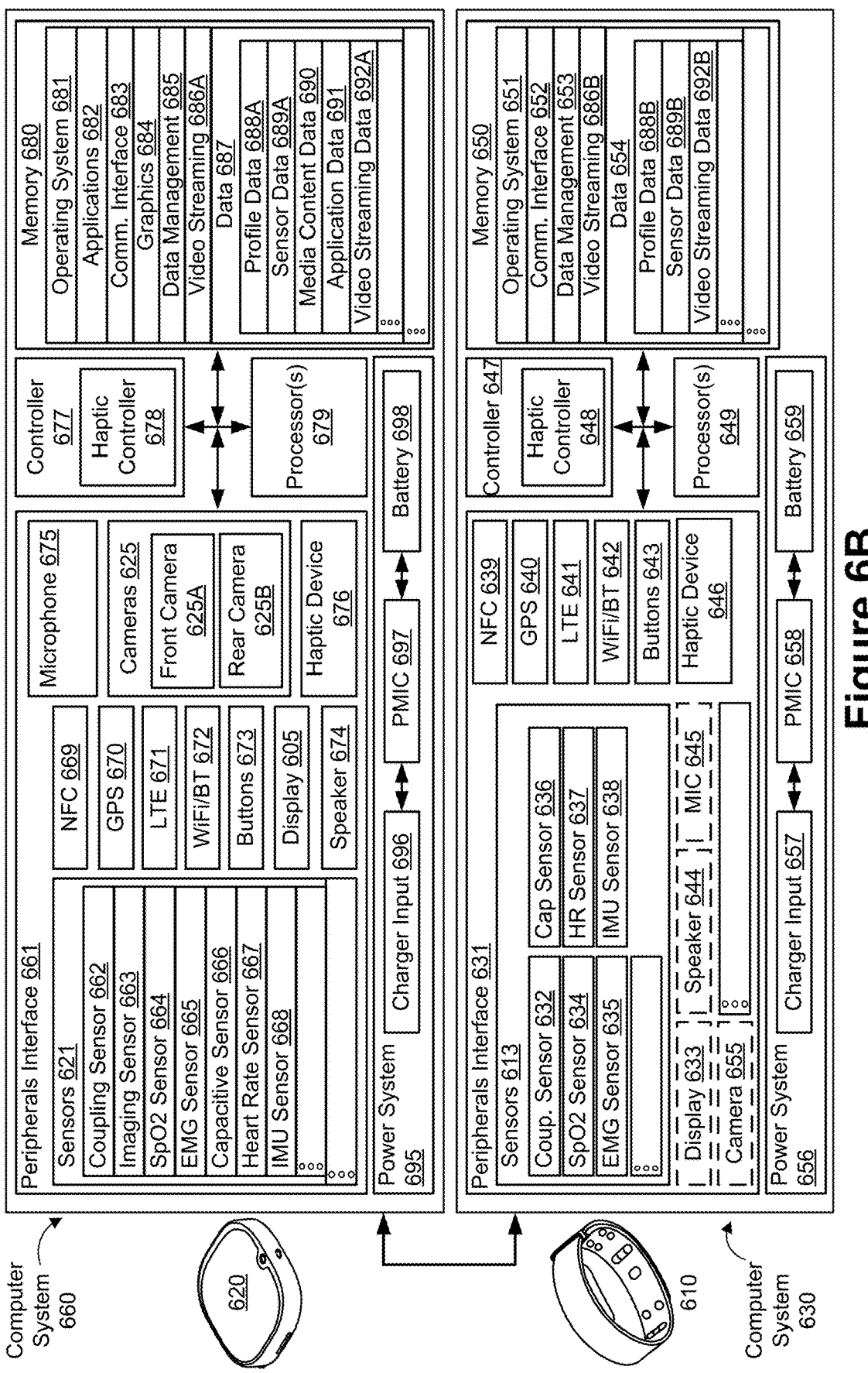

FIGS. 6A and 6B illustrate an example wrist-wearable device 600, in accordance with some embodiments. The wrist-wearable device 600 is an instance of the wearable device 195 described FIGS. 1A-1F herein, such that the wearable device should be understood to have the features of the wrist-wearable device 600 and vice versa. FIG. 6A illustrates components of the wrist-wearable device 6, which can be used individually or in combination, including combinations that include other electronic devices and/or electronic components.

FIG. 6A shows a wearable band 610 and a watch body 620 (or capsule) being coupled, as discussed below, to form the wrist-wearable device 600. The wrist-wearable device 600 can perform various functions and/or operations associated with navigating through user interfaces and selectively opening applications, as well as the functions and/or operations described above with reference to FIGS. 1A-4.

As will be described in more detail below, operations executed by the wrist-wearable device 600 can include: (i) presenting content to a user (e.g., displaying visual content via a display 605); (ii) detecting (e.g., sensing) user input (e.g., sensing a touch on peripheral button 623 and/or at a touch screen of the display 605, a hand gesture detected by sensors (e.g., biopotential sensors)); (iii) sensing biometric data via one or more sensors 613 (e.g., neuromuscular signals, heart rate, temperature, sleep, etc.); messaging (e.g., text, speech, video, etc.); image capture via one or more imaging devices or cameras 625; wireless communications (e.g., cellular, near field, Wi-Fi, personal area network, etc.); location determination; financial transactions; providing haptic feedback; alarms; notifications; biometric authentication; health monitoring; sleep monitoring; etc.

The above-example functions can be executed independently in the watch body 620, independently in the wearable band 610, and/or via an electronic communication between the watch body 620 and the wearable band 610. In some embodiments, functions can be executed on the wrist-wearable device 600 while an AR environment is being presented (e.g., via one of the AR systems 500a to 500d). As the skilled artisan will appreciate upon reading the descriptions provided herein, the novel wearable devices described herein can be used with other types of AR environments.

The wearable band 610 can be configured to be worn by a user such that an inner surface 611 of the wearable band 610 is in contact with the user's skin. When worn by a user, sensors 613 contact the user's skin. The sensors 613 can sense biometric data such as a user's heart rate, saturated oxygen level, temperature, sweat level, neuromuscular signal sensors, or a combination thereof. The sensors 613 can also sense data about a user's environment including a user's motion, altitude, location, orientation, gait, acceleration, position, or a combination thereof. In some embodiment, the sensors 613 are configured to track a position and/or motion of the wearable band 610. The one or more sensors 613 can include any of the sensors defined above and/or discussed below with respect to FIG. 6B.

The one or more sensors 613 can be distributed on an inside and/or an outside surface of the wearable band 610. In some embodiments, the one or more sensors 613 are uniformly spaced along the wearable band 610. Alternatively, in some embodiments, the one or more sensors 613 are positioned at distinct points along the wearable band 610. As shown in FIG. 6A, the one or more sensors 613 can be the same or distinct. For example, in some embodiments, the one or more sensors 613 can be shaped as a pill (e.g., sensor 613a), an oval, a circle a square, an oblong (e.g., sensor 613c) and/or any other shape that maintains contact with the user's skin (e.g., such that neuromuscular signal and/or other biometric data can be accurately measured at the user's skin). In some embodiments, the one or more sensors 613 are aligned to form pairs of sensors (e.g., for sensing neuromuscular signals based on differential sensing within each respective sensor). For example, sensor 613b is aligned with an adjacent sensor to form sensor pair 614a and sensor 613d aligned with an adjacent sensor to form sensor pair 614b. In some embodiments, the wearable band 610 does not have a sensor pair. Alternatively, in some embodiments, the wearable band 610 has a predetermined number of sensor pairs (one pair of sensors, three pairs of sensors, four pairs of sensors, six pairs of sensors, sixteen pairs of sensors, etc.).

The wearable band 610 can include any suitable number of sensors 613. In some embodiments, the number and arrangement of sensors 613 depends on the particular application for which the wearable band 610 is used. For instance, a wearable band 610 configured as an armband, wristband, or chest-band may include a plurality of sensors 613 with different number of sensors 613 and different arrangement for each use case, such as medical use cases as compared to gaming or general day-to-day use cases.

In accordance with some embodiments, the wearable band 610 further includes an electrical ground electrode and a shielding electrode. The electrical ground and shielding electrodes, like the sensors 613, can be distributed on the inside surface of the wearable band 610 such that they contact a portion of the user's skin. For example, the electrical ground and shielding electrodes can be at an inside surface of coupling mechanism 616 or an inside surface of a wearable structure 611. The electrical ground and shielding electrodes can be formed and/or use the same components as the sensors 613. In some embodiments, the wearable band 610 includes more than one electrical ground electrode and more than one shielding electrode.

The sensors 613 can be formed as part of the wearable structure 611 of the wearable band 610. In some embodiments, the sensors 613 are flush or substantially flush with the wearable structure 611 such that they do not extend beyond the surface of the wearable structure 611. While flush with the wearable structure 611, the sensors 613 are still configured to contact the user's skin (e.g., via a skin-contacting surface). Alternatively, in some embodiments, the sensors 613 extend beyond the wearable structure 611 a predetermined distance (e.g., 0.1-2 mm) to make contact and depress into the user's skin. In some embodiment, the sensors 613 are coupled to an actuator (not shown) configured to adjust an extension height (e.g., a distance from the surface of the wearable structure 611) of the sensors 613 such that the sensors 613 make contact and depress into the user's skin. In some embodiments, the actuators adjust the extension height between 0.01 mm-1.2 mm. This allows the user to customize the positioning of the sensors 613 to improve the overall comfort of the wearable band 610 when worn while still allowing the sensors 613 to contact the user's skin. In some embodiments, the sensors 613 are indistinguishable from the wearable structure 611 when worn by the user.

The wearable structure 611 can be formed of an elastic material, elastomers, etc. configured to be stretched and fitted to be worn by the user. In some embodiments, the wearable structure 611 is a textile or woven fabric. As described above, the sensors 613 can be formed as part of a wearable structure 611. For example, the sensors 613 can be molded into the wearable structure 611 or be integrated into a woven fabric (e.g., the sensors 613 can be sewn into the fabric and mimic the pliability of fabric (e.g., the sensors 613 can be constructed from a series woven strands of fabric)).

The wearable structure 611 can include flexible electronic connectors that interconnect the sensors 613, the electronic circuitry, and/or other electronic components (described below in reference to FIG. 6B) that are enclosed in the wearable band 610. In some embodiments, the flexible electronic connectors are configured to interconnect the sensors 613, the electronic circuitry, and/or other electronic components of the wearable band 610 with respective sensors and/or other electronic components of another electronic device (e.g., watch body 620). The flexible electronic connectors are configured to move with the wearable structure 611 such that the user adjustment to the wearable structure 611 (e.g., resizing, pulling, folding, etc.) does not stress or strain the electrical coupling of components of the wearable band 610.

As described above, the wearable band 610 is configured to be worn by a user. In particular, the wearable band 610 can be shaped or otherwise manipulated to be worn by a user. For example, the wearable band 610 can be shaped to have a substantially circular shape such that it can be configured to be worn on the user's lower arm or wrist. Alternatively, the wearable band 610 can be shaped to be worn on another body part of the user, such as the user's upper arm (e.g., around a bicep), forearm, chest, legs, etc. The wearable band 610 can include a retaining mechanism 612 (e.g., a buckle, a hook and loop fastener, etc.) for securing the wearable band 610 to the user's wrist or other body part. While the wearable band 610 is worn by the user, the sensors 613 sense data (referred to as sensor data) from the user's skin. In particular, the sensors 613 of the wearable band 610 obtain (e.g., sense and record) neuromuscular signals.

The sensed data (e.g., sensed neuromuscular signals) can be used to detect and/or determine the user's intention to perform certain motor actions. In particular, the sensors 613 sense and record neuromuscular signals from the user as the user performs muscular activations (e.g., movements, gestures, etc.). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 605 of the wrist-wearable device 600 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 613 can be used to provide a user with an enhanced interaction with a physical object (e.g., devices communicatively coupled with the wearable band 610) and/or a virtual object in an artificial-reality application generated by an artificial-reality system (e.g., user interface objects presented on the display 605, or another computing device (e.g., a smartphone)).

In some embodiments, the wearable band 610 includes one or more haptic devices 646 (FIG. 6B, e.g., a vibratory haptic actuator) that are configured to provide haptic feedback (e.g., a cutaneous and/or kinesthetic sensation, etc.) to the user's skin. The sensors 613, and/or the haptic devices 646 can be configured to operate in conjunction with multiple applications including, without limitation, health monitoring, social media, games, and artificial reality (e.g., the applications associated with artificial reality).

The wearable band 610 can also include coupling mechanism 616 (e.g., a cradle or a shape of the coupling mechanism can correspond to shape of the watch body 620 of the wrist-wearable device 600) for detachably coupling a capsule (e.g., a computing unit) or watch body 620 (via a coupling surface of the watch body 620) to the wearable band 610. In particular, the coupling mechanism 616 can be configured to receive a coupling surface proximate to the bottom side of the watch body 620 (e.g., a side opposite to a front side of the watch body 620 where the display 605 is located), such that a user can push the watch body 620 downward into the coupling mechanism 616 to attach the watch body 620 to the coupling mechanism 616. In some embodiments, the coupling mechanism 616 can be configured to receive a top side of the watch body 620 (e.g., a side proximate to the front side of the watch body 620 where the display 605 is located) that is pushed upward into the cradle, as opposed to being pushed downward into the coupling mechanism 616. In some embodiments, the coupling mechanism 616 is an integrated component of the wearable band 610 such that the wearable band 610 and the coupling mechanism 616 are a single unitary structure. In some embodiments, the coupling mechanism 616 is a type of frame or shell that allows the watch body 620 coupling surface to be retained within or on the wearable band 610 coupling mechanism 616 (e.g., a cradle, a tracker band, a support base, a clasp, etc.).

The coupling mechanism 616 can allow for the watch body 620 to be detachably coupled to the wearable band 610 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 620 to the wearable band 610 and to decouple the watch body 620 from the wearable band 610. For example, a user can twist, slide, turn, push, pull, or rotate the watch body 620 relative to the wearable band 610, or a combination thereof, to attach the watch body 620 to the wearable band 610 and to detach the watch body 620 from the wearable band 610. Alternatively, as discussed below, in some embodiments, the watch body 620 can be decoupled from the wearable band 610 by actuation of the release mechanism 629.

The wearable band 610 can be coupled with a watch body 620 to increase the functionality of the wearable band 610 (e.g., converting the wearable band 610 into a wrist-wearable device 600, adding an additional computing unit and/or battery to increase computational resources and/or a battery life of the wearable band 610, adding additional sensors to improve sensed data, etc.). As described above, the wearable band 610 (and the coupling mechanism 616) is configured to operate independently (e.g., execute functions independently) from watch body 620. For example, the coupling mechanism 616 can include one or more sensors 613 that contact a user's skin when the wearable band 610 is worn by the user and provide sensor data for determining control commands.

A user can detach the watch body 620 (or capsule) from the wearable band 610 in order to reduce the encumbrance of the wrist-wearable device 600 to the user. For embodiments in which the watch body 620 is removable, the watch body 620 can be referred to as a removable structure, such that in these embodiments the wrist-wearable device 600 includes a wearable portion (e.g., the wearable band 610) and a removable structure (the watch body 620).

Turning to the watch body 620, the watch body 620 can have a substantially rectangular or circular shape. The watch body 620 is configured to be worn by the user on their wrist or on another body part. More specifically, the watch body 620 is sized to be easily carried by the user, attached on a portion of the user's clothing, and/or coupled to the wearable band 610 (forming the wrist-wearable device 600). As described above, the watch body 620 can have a shape corresponding to the coupling mechanism 616 of the wearable band 610. In some embodiments, the watch body 620 includes a single release mechanism 629 or multiple release mechanisms (e.g., two release mechanisms 629 positioned on opposing sides of the watch body 620, such as spring-loaded buttons) for decoupling the watch body 620 and the wearable band 610. The release mechanism 629 can include, without limitation, a button, a knob, a plunger, a handle, a lever, a fastener, a clasp, a dial, a latch, or a combination thereof.

A user can actuate the release mechanism 629 by pushing, turning, lifting, depressing, shifting, or performing other actions on the release mechanism 670. Actuation of the release mechanism 629 can release (e.g., decouple) the watch body 620 from the coupling mechanism 616 of the wearable band 610, allowing the user to use the watch body 620 independently from wearable band 610, and vice versa. For example, decoupling the watch body 620 from the wearable band 610 can allow the user to capture images using rear-facing camera 625B. Although the is shown positioned at a corner of watch body 620, the release mechanism 629 can be positioned anywhere on watch body 620 that is convenient for the user to actuate. In addition, in some embodiments, the wearable band 610 can also include a respective release mechanism for decoupling the watch body 620 from the coupling mechanism 616. In some embodiments, the release mechanism 629 is optional and the watch body 620 can be decoupled from the coupling mechanism 616 as described above (e.g., via twisting, rotating, etc.).

The watch body 620 can include one or more peripheral buttons 623 and 627 for performing various operations at the watch body 620. For example, the peripheral buttons 623 and 627 can be used to turn on or wake (e.g., transition from a sleep state to an active state) the display 605, unlock the watch body 620, increase or decrease a volume, increase or decrease a brightness, interact with one or more applications, interact with one or more user interfaces, etc. Additionally, or alternatively, in some embodiments, the display 605 operates as a touch screen and allows the user to provide one or more inputs for interacting with the watch body 620.

In some embodiments, the watch body 620 includes one or more sensors 621. The sensors 621 of the watch body 620 can be the same or distinct from the sensors 613 of the wearable band 610. The sensors 621 of the watch body 620 can be distributed on an inside and/or an outside surface of the watch body 620. In some embodiments, the sensors 621 are configured to contact a user's skin when the watch body 620 is worn by the user. For example, the sensors 621 can be placed on the bottom side of the watch body 620 and the coupling mechanism 616 can be a cradle with an opening that allows the bottom side of the watch body 620 to directly contact the user's skin. Alternatively, in some embodiments, the watch body 620 does not include sensors that are configured to contact the user's skin (e.g., including sensors internal and/or external to the watch body 620 that configured to sense data of the watch body 620 and the watch body 620's surrounding environment). In some embodiment, the sensors 613 are configured to track a position and/or motion of the watch body 620.

The watch body 620 and the wearable band 610 can share data using a wired communication method (e.g., a Universal Asynchronous Receiver/Transmitter (UART), a USB transceiver, etc.) and/or a wireless communication method (e.g., near field communication, Bluetooth, etc.). For example, the watch body 620 and the wearable band 610 can share data sensed by the sensors 613 and 621, as well as application and device specific information (e.g., active and/or available applications, output devices (e.g., display, speakers, etc.), input devices (e.g., touch screen, microphone, imaging sensors, etc.).

In some embodiments, the watch body 620 can include, without limitation, a front-facing camera 625A and/or a rear-facing camera 625B, sensors 621 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 673; FIG. 6B), a touch sensor, a sweat sensor, etc.). In some embodiments, the watch body 620 can include one or more haptic devices 676 (FIG. 6B; a vibratory haptic actuator) that is configured to provide haptic feedback (e.g., a cutaneous and/or kinesthetic sensation, etc.) to the user. The sensors 621 and/or the haptic device 676 can also be configured to operate in conjunction with multiple applications including, without limitation, health monitoring applications, social media applications, game applications, and artificial reality applications (e.g., the applications associated with artificial reality).

As described above, the watch body 620 and the wearable band 610, when coupled, can form the wrist-wearable device 600. When coupled, the watch body 620 and wearable band 610 operate as a single device to execute functions (operations, detections, communications, etc.) described herein. In some embodiments, each device is provided with particular instructions for performing the one or more operations of the wrist-wearable device 600. For example, in accordance with a determination that the watch body 620 does not include neuromuscular signal sensors, the wearable band 610 can include alternative instructions for performing associated instructions (e.g., providing sensed neuromuscular signal data to the watch body 620 via a different electronic device). Operations of the wrist-wearable device 600 can be performed by the watch body 620 alone or in conjunction with the wearable band 610 (e.g., via respective processors and/or hardware components) and vice versa. In some embodiments, operations of the wrist-wearable device 600, the watch body 620, and/or the wearable band 610 can be performed in conjunction with one or more processors and/or hardware components of another communicatively coupled device (e.g., the HIPD 800; FIGS. 8A-8B).

As described below with reference to the block diagram of FIG. 6B, the wearable band 610 and/or the watch body 620 can each include independent resources required to independently execute functions. For example, the wearable band 610 and/or the watch body 620 can each include a power source (e.g., a battery), a memory, data storage, a processor (e.g., a central processing unit (CPU)), communications, a light source, and/or input/output devices.

FIG. 6B shows block diagrams of a computing system 630 corresponding to the wearable band 610, and a computing system 660 corresponding to the watch body 620, according to some embodiments. A computing system of the wrist-wearable device 600 includes a combination of components of the wearable band computing system 630 and the watch body computing system 660, in accordance with some embodiments.

The watch body 620 and/or the wearable band 610 can include one or more components shown in watch body computing system 660. In some embodiments, a single integrated circuit includes all or a substantial portion of the components of the watch body computing system 660 are included in a single integrated circuit. Alternatively, in some embodiments, components of the watch body computing system 660 are included in a plurality of integrated circuits that are communicatively coupled. In some embodiments, the watch body computing system 660 is configured to couple (e.g., via a wired or wireless connection) with the wearable band computing system 630, which allows the computing systems to share components, distribute tasks, and/or perform other operations described herein (individually or as a single device).

The watch body computing system 660 can include one or more processors 679, a controller 677, a peripherals interface 661, a power system 695, and memory (e.g., a memory 680), each of which are defined above and described in more detail below.

The power system 695 can include a charger input 696, a power-management integrated circuit (PMIC) 697, and a battery 696, each are which are defined above. In some embodiments, a watch body 620 and a wearable band 610 can have respective batteries (e.g., battery 696 and 659), and can share power with each other. The watch body 620 and the wearable band 610 can receive a charge using a variety of techniques. In some embodiments, the watch body 620 and the wearable band 610 can use a wired charging assembly (e.g., power cords) to receive the charge. Alternatively, or in addition, the watch body 620 and/or the wearable band 610 can be configured for wireless charging. For example, a portable charging device can be designed to mate with a portion of watch body 620 and/or wearable band 610 and wirelessly deliver usable power to a battery of watch body 620 and/or wearable band 610. The watch body 620 and the wearable band 610 can have independent power systems (e.g., power system 695 and 656) to enable each to operate independently. The watch body 620 and wearable band 610 can also share power (e.g., one can charge the other) via respective PMICs (e.g., PMICs 697 and 658) that can share power over power and ground conductors and/or over wireless charging antennas.

In some embodiments, the peripherals interface 661 can include one or more sensors 621, many of which listed below are defined above. The sensors 621 can include one or more coupling sensor 662 for detecting when the watch body 620 is coupled with another electronic device (e.g., a wearable band 610). The sensors 621 can include imaging sensors 663 (one or more of the cameras 625, and/or separate imaging sensors 663 (e.g., thermal-imaging sensors)). In some embodiments, the sensors 621 include one or more SpO2 sensors 664. In some embodiments, the sensors 621 include one or more biopotential-signal sensors (e.g., EMG sensors 665, which may be disposed on a user-facing portion of the watch body 620 and/or the wearable band 610). In some embodiments, the sensors 621 include one or more capacitive sensors 666. In some embodiments, the sensors 621 include one or more heart rate sensors 667. In some embodiments, the sensors 621 include one or more IMU sensors 668. In some embodiments, one or more IMU sensors 668 can be configured to detect movement of a user's hand or other location that the watch body 620 is placed or held).

In some embodiments, the peripherals interface 661 includes a near-field communication (NFC) component 669, a global-position system (GPS) component 670, a long-term evolution (LTE) component 671, and/or a Wi-Fi and/or Bluetooth communication component 672. In some embodiments, the peripherals interface 661 includes one or more buttons 673 (e.g., the peripheral buttons 623 and 627 in FIG. 6A), which, when selected by a user, cause operation to be performed at the watch body 620. In some embodiments, the peripherals interface 661 includes one or more indicators, such as a light emitting diode (LED), to provide a user with visual indicators (e.g., message received, low battery, active microphone and/or camera, etc.).

The watch body 620 can include at least one display 605, for displaying visual representations of information or data to the user, including user-interface elements and/or three-dimensional virtual objects. The display can also include a touch screen for inputting user inputs, such as touch gestures, swipe gestures, and the like. The watch body 620 can include at least one speaker 674 and at least one microphone 675 for providing audio signals to the user and receiving audio input from the user. The user can provide user inputs through the microphone 675 and can also receive audio output from the speaker 674 as part of a haptic event provided by the haptic controller 678. The watch body 620 can include at least one camera 625, including a front camera 625A and a rear camera 625B. The cameras 625 can include ultra-wide-angle cameras, wide angle cameras, fisheye cameras, spherical cameras, telephoto cameras, a depth-sensing cameras, or other types of cameras.

The watch body computing system 660 can include one or more haptic controllers 677 and associated componentry (e.g., haptic devices 676) for providing haptic events at the watch body 620 (e.g., a vibrating sensation or audio output in response to an event at the watch body 620). The haptic controllers 678 can communicate with one or more haptic devices 676, such as electroacoustic devices, including a speaker of the one or more speakers 674 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 678 can provide haptic events to that are capable of being sensed by a user of the watch body 620. In some embodiments, the one or more haptic controllers 678 can receive input signals from an application of the applications 682.

In some embodiments, the computer system 630 and/or the computer system 660 can include memory 680, which can be controlled by a memory controller of the one or more controllers 677. In some embodiments, software components stored in the memory 680 include one or more applications 682 configured to perform operations at the watch body 620. In some embodiments, the one or more applications 680 include games, word processors, messaging applications, calling applications, web browsers, social media applications, media streaming applications, financial applications, calendars, clocks, etc. In some embodiments, software components stored in the memory 680 include one or more communication interface modules 683 as defined above. In some embodiments, software components stored in the memory 680 include one or more graphics modules 684 for rendering, encoding, and/or decoding audio and/or visual data; and one or more data management modules 685 for collecting, organizing, and/or providing access to the data 687 stored in memory 680. In some embodiments, software components stored in the memory 680 include a video streaming module 686A, which is configured to perform the features described above in reference to FIGS.

1A-4. In some embodiments, one or more of applications 682 and/or one or more modules can work in conjunction with one another to perform various tasks at the watch body 620.

In some embodiments, software components stored in the memory 680 can include one or more operating systems 681 (e.g., a Linux-based operating system, an Android operating system, etc.). The memory 680 can also include data 687. The data 687 can include profile data 688A, sensor data 689A, media content data 690, application data 691, and video streaming data 692A, which stores data related to the performance of the features described above in reference to FIGS. 1A-4.

It should be appreciated that the watch body computing system 660 is an example of a computing system within the watch body 620, and that the watch body 620 can have more or fewer components than shown in the watch body computing system 660, combine two or more components, and/or have a different configuration and/or arrangement of the components. The various components shown in watch body computing system 660 are implemented in hardware, software, firmware, or a combination thereof, including one or more signal processing and/or application-specific integrated circuits.

Turning to the wearable band computing system 630, one or more components that can be included in the wearable band 610 are shown. The wearable band computing system 630 can include more or fewer components than shown in the watch body computing system 660, combine two or more components, and/or have a different configuration and/or arrangement of some or all of the components. In some embodiments, all, or a substantial portion of the components of the wearable band computing system 630 are included in a single integrated circuit. Alternatively, in some embodiments, components of the wearable band computing system 630 are included in a plurality of integrated circuits that are communicatively coupled. As described above, in some embodiments, the wearable band computing system 630 is configured to couple (e.g., via a wired or wireless connection) with the watch body computing system 660, which allows the computing systems to share components, distribute tasks, and/or perform other operations described herein (individually or as a single device).

The wearable band computing system 630, similar to the watch body computing system 660, can include one or more processors 649, one or more controllers 647 (including one or more haptics controller 648), a peripherals interface 631 that can includes one or more sensors 613 and other peripheral devices, power source (e.g., a power system 656), and memory (e.g., a memory 650) that includes an operating system (e.g., an operating system 651), data (e.g., data 654 including profile data 688B, sensor data 689B, video streaming module 689B, etc.), and one or more modules (e.g., a communications interface module 652, a data management module 653, a video streaming module 686B, etc.).

The one or more sensors 613 can be analogous to sensors 621 of the computer system 660 and in light of the definitions above. For example, sensors 613 can include one or more coupling sensors 632, one or more SpO2 sensor 634, one or more EMG sensors 635, one or more capacitive sensor 636, one or more heart rate sensor 637, and one or more IMU sensor 638.

The peripherals interface 631 can also include other components analogous to those included in the peripheral interface 661 of the computer system 660, including an NFC component 639, a GPS component 640, an LTE component 641, a Wi-Fi and/or Bluetooth communication component 642, and/or one or more haptic devices 676 as described above in reference to peripherals interface 661. In some embodiments, the peripherals interface 621 includes one or more buttons 643, a display 633, a speaker 644, a microphone 645, and a camera 655. In some embodiments, the peripherals interface 621 includes one or more indicators, such as an LED.

It should be appreciated that the wearable band computing system 630 is an example of a computing system within the wearable band 610, and that the wearable band 610 can have more or fewer components than shown in the wearable band computing system 630, combine two or more components, and/or have a different configuration and/or arrangement of the components. The various components shown in wearable band computing system 630 can be implemented in one or a combination of hardware, software, firmware, including one or more signal processing and/or application-specific integrated circuits.

The wrist-wearable device 600 with respect to FIG. 6A is an example of the wearable band 610 and the watch body 620 coupled, so the wrist-wearable device 600 will be understood to include the components shown and described for the wearable band computing system 630 and the watch body computing system 660. In some embodiments, wrist-wearable device 600 has a split architecture (e.g., a split mechanical architecture, a split electrical architecture) between the watch body 620 and the wearable band 610. In other words, all of the components shown in the wearable band computing system 630 and the watch body computing system 660 can be housed or otherwise disposed in a combined watch device 600, or within individual components of the watch body 620, wearable band 610, and/or portions thereof (e.g., a coupling mechanism 616 of the wearable band 610).

The techniques described above can be used with any device for sensing neuromuscular signals, including the arm-wearable devices of FIG. 6A-6B, but could also be used with other types of wearable devices for sensing neuromuscular signals (such as body-wearable or head-wearable devices that might have neuromuscular sensors closer to the brain or spinal column).

In some embodiments, a wrist-wearable device 600 can be used in conjunction with a head-wearable device described below (e.g., AR glasses 700 and VR headset 750) and/or an HIPD 800; and the wrist-wearable device 600 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable device, attention will now be turned to example head-wearable devices, such AR glasses 700 and VR headset 750.

Example Head-Wearable Devices

FIGS. 7A-1 to 7B-3 show example artificial-reality systems, including the AR system 700. In some embodiments, the AR system 600 includes an eyewear device 702, as shown in FIGS. 7A-1 to 7A-2. In some embodiments, the VR system 710 includes a head-mounted display (HMD) 752, as shown in FIGS. 7B-1 and 7B-2. In some embodiments, the AR system 700 and the VR system 710 can include one or more analogous components (e.g., components for presenting interactive artificial-reality environments, such as processors, memory, and/or presentation devices, including one or more displays and/or one or more waveguides), some of which are described in more detail with respect to FIG. 7C. As described herein, a head-wearable device can include components of the eyewear device 702, and/or the head-mounted display 752. Some embodiments of head-wearable devices do not include any displays, including any of the displays described with respect to the AR system 700 and/or the VR system 710. While the example artificial-reality systems are respectively described herein as the AR system 700 and the VR system 710, either or both of the example AR systems described herein can be configured to present fully-immersive VR scenes presented in substantially all of a user's field of view, additionally or alternatively to, subtler augmented-reality scenes that are presented within a portion, less than all, of the user's field of view.

FIG. 7A show an example visual depiction of the AR system 700, including an eyewear device 702 (which may also be described herein as augmented-reality glasses, and/or smart glasses). The AR system 700 can include additional electronic components that are not shown in FIGS. 7A, such as a wearable accessory device and/or an intermediary processing device, in electronic communication or otherwise configured to be used in conjunction with the eyewear device 702. In some embodiments, the wearable accessory device and/or the intermediary processing device may be configured to couple with the eyewear device 702 via a coupling mechanism in electronic communication with a coupling sensor 734, where the coupling sensor 734 can detect when an electronic device becomes physically or electronically coupled with the eyewear device 702. In some embodiments, the eyewear device 702 can be configured to couple to a housing 790, which may include one or more additional coupling mechanisms configured to couple with additional accessory devices. The components shown in FIG. 7A can be implemented in hardware, software, firmware, or a combination thereof, including one or more signal-processing components and/or application-specific integrated circuits (ASICs).

The eyewear device 702 includes mechanical glasses components, including a frame 704 configured to hold one or more lenses (e.g., one or both lenses 706-1 and 706-2). One of ordinary skill in the art will appreciate that the eyewear device 702 can include additional mechanical components, such as hinges configured to allow portions of the frame 704 of the eyewear device 702 to be folded and unfolded, a bridge configured to span the gap between the lenses 706-1 and 706-2 and rest on the user's nose, nose pads configured to rest on the bridge of the nose and provide support for the eyewear device 702, earpieces configured to rest on the user's ears and provide additional support for the eyewear device 702, temple arms configured to extend from the hinges to the earpieces of the eyewear device 702, and the like. One of ordinary skill in the art will further appreciate that some examples of the AR system 700 can include none of the mechanical components described herein. For example, smart contact lenses configured to present artificial reality to users may not include any components of the eyewear device 702.

The eyewear device 702 includes electronic components, many of which will be described in more detail below with respect to FIG. 7C. Some example electronic components are illustrated in FIG. 7A, including acoustic sensors 725-1, 725-2, 725-3, 725-4, 725-5, and 725-1, which can be distributed along a substantial portion of the frame 704 of the eyewear device 702. The eyewear device 702 also includes a left camera 739A and a right camera 739B, which are located on different sides of the frame 704. And the eyewear device includes a processor 748 (e.g., an integral micropro-cessor, such as an ASIC) that is embedded into a portion of the frame 704.

FIGS. 7B-1 and 7B-2 show a VR system 710 that includes a head-mounted display (HMD) 712 (e.g., also referred to herein as an artificial-reality headset, a head-wearable device, a VR headset, etc.), in accordance with some embodiments. As noted, some artificial-reality systems may (e.g., the AR system 700), instead of blending an artificial reality with actual reality, substantially replace one or more of a user's sensory perceptions of the real world with a virtual experience (e.g., the AR systems 500*c* and 500*d*).

The HMD 712 includes a front body 714 and a frame 716 (e.g., a strap or band) shaped to fit around a user's head. In some embodiments, the front body 714 and/or the frame 716 includes one or more electronic elements for facilitating presentation of and/or interactions with an AR and/or VR system (e.g., displays, IMUs, tracking emitter or detectors). In some embodiments, the HMD 712 includes output audio transducers (e.g., an audio transducer 718-1), as shown in FIG. 7B-2. In some embodiments, one or more components, such as the output audio transducer(s) 718-1 and the frame 716, can be configured to attach and detach (e.g., are detachably attachable) to the HMD 712 (e.g., a portion or all of the frame 716, and/or the audio transducer 718-1), as shown in FIG. 7B-2. In some embodiments, coupling a detachable component to the HMD 712 causes the detach-able component to come into electronic communication with the HMD 712.

FIG. 7B-1 to 7B-2 also show that the VR system 710 one or more cameras, such as the left camera 739A and the right camera 739B, which can be analogous to the left and right cameras on the frame 704 of the eyewear device 702. In some embodiments, the VR system 710 includes one or more additional cameras (e.g., cameras 739C and 739D), which can be configured to augment image data obtained by the cameras 739A and 739B by providing more information. For example, the camera 739C can be used to supply color information that is not discerned by cameras 739A and 739B. In some embodiments, one or more of the cameras 739A to 739D can include an optional IR cut filter config-ured to remove IR light from being received at the respective camera sensors.

Figure 7C:
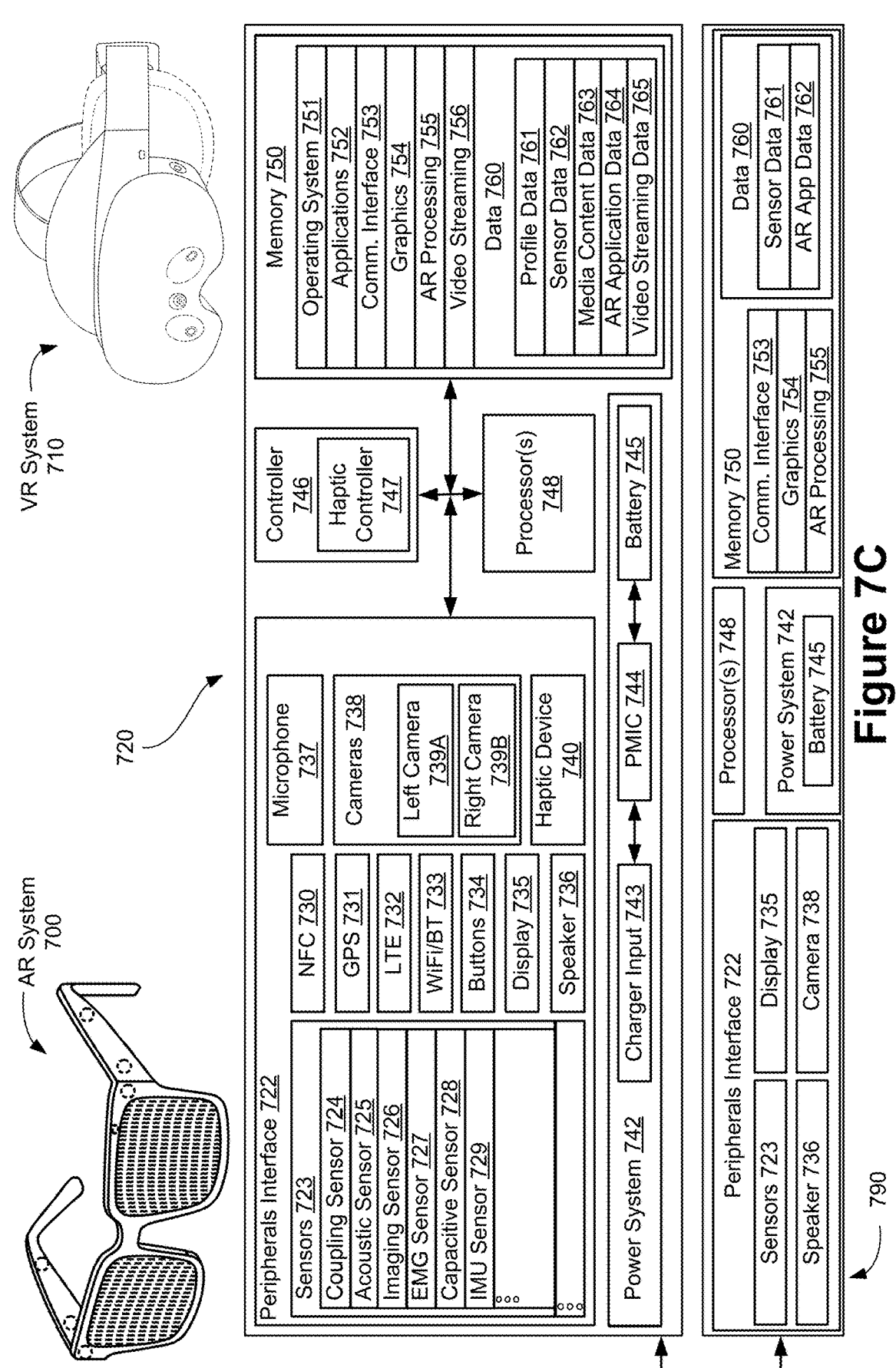

FIG. 7C illustrates a computing system 720 and an optional housing 790, each of which show components that can be included in the AR system 700 and/or the VR system 710. In some embodiments, more or less components can be included in the optional housing 790 depending on practical restraints of the respective AR system being described.

In some embodiments, the computing system 720 and/or the optional housing 790 can include one or more peripheral interfaces 722, one or more power systems 742, one or more controllers 746 (including one or more haptic controllers 747), one or more processors 748 (as defined above, includ-ing any of the examples provided), and memory 750, which can all be in electronic communication with each other. For example, the one or more processors 748 can be configured to execute instructions stored in the memory 750, which can cause a controller of the one or more controllers 746 to cause operations to be performed at one or more peripheral devices of the peripherals interface 722. In some embodiments, each operation described can occur based on electrical power provided by the power system 742.

In some embodiments, the peripherals interface 722 can include one or more devices configured to be part of the computing system 720, many of which have been defined above and/or described with respect to wrist-wearable devices shown in FIGS. 6A and 6B. For example, the peripherals interface can include one or more sensors 723. Some example sensors include: one or more coupling sen-sors 724, one or more acoustic sensors 725, one or more imaging sensors 726, one or more EMG sensors 727, one or more capacitive sensors 728, and/or one or more IMU sensors 729; and/or any other types of sensors defined above or described with respect to any other embodiments dis-cussed herein.

In some embodiments, the peripherals interface can include one or more additional peripheral devices, including one or more NFC devices 730, one or more GPS devices 731, one or more LTE devices 732, one or more WiFi and/or Bluetooth devices 733, one or more buttons 734 (e.g., including buttons that are slidable or otherwise adjustable), one or more displays 735, one or more speakers 736, one or more microphones 737, one or more cameras 738 (e.g., including the left camera 739A and/or a right camera 739B), and/or one or more haptic devices 740; and/or any other types of peripheral devices defined above or described with respect to any other embodiments discussed herein.

AR systems can include a variety of types of visual feedback mechanisms (e.g., presentation devices). For example, display devices in the AR system 700 and/or the VR system 710 can include one or more liquid-crystal displays (LCDs), light emitting diode (LED) displays, organic LED (OLED) displays, and/or any other suitable types of display screens. Artificial-reality systems can include a single display screen (e.g., configured to be seen by both eyes), and/or can provide separate display screens for each eye, which can allow for additional flexibility for varifocal adjustments and/or for correcting a refractive error associated with the user's vision. Some embodiments of AR systems also include optical subsystems having one or more lenses (e.g., conventional concave or convex lenses, Fresnel lenses, or adjustable liquid lenses) through which a user can view a display screen.

For example, respective displays 705 can be coupled to each of the lenses 706-1 and 706-2 of the AR system 700. The displays 705 coupled to each of the lenses 706-1 and 706-2 can act together or independently to present an image or series of images to a user. In some embodiments, the AR system 700 includes a single display 705 (e.g., a near-eye display) or more than two displays 705. In some embodi-ments, a first set of one or more displays 705 can be used to present an augmented-reality environment, and a second set of one or more display devices 705 can be used to present a virtual-reality environment. In some embodiments, one or more waveguides are used in conjunction with presenting artificial-reality content to the user of the AR system 700 (e.g., as a means of delivering light from one or more displays 705 to the user's eyes). In some embodiments, one or more waveguides are fully or partially integrated into the eyewear device 702. Additionally, or alternatively to display screens, some artificial-reality systems include one or more projection systems. For example, display devices in the AR system 700 and/or the virtual-reality system 750 can include micro-LED projectors that project light (e.g., using a wave-guide) into display devices, such as clear combiner lenses that allow ambient light to pass through. The display devices can refract the projected light toward a user's pupil and can enable a user to simultaneously view both artificial-reality content and the real world. Artificial-reality systems can also be configured with any other suitable type or form of image projection system. In some embodiments, one or more waveguides are provided additionally or alternatively to the one or more display(s) 705.

The computing system 720 and/or the optional housing 790 of the AR system 700 or the VR system 710 can include some or all of the components of a power system 742. The power system 742 can include one or more charger inputs 743, one or more PMICs 744, and/or one or more batteries 745.

The memory 750 includes instructions and data, some or all of which may be stored as non-transitory computer-readable storage media within the memory 750. For example, the memory 750 can include one or more operating systems 751; one or more applications 752; one or more communication interface applications 753; one or more graphics applications 754; one or more AR processing applications 755; one or more specification-specific modules 756 for video streaming; and/or any other types of data defined above or described with respect to any other embodiments discussed herein.

The memory 750 also includes data 760 which can be used in conjunction with one or more of the applications discussed above. The data 760 can include: profile data 761; sensor data 762; media content data 763; AR application data 764; specification-specific data 765 for video streaming; and/or any other types of data defined above or described with respect to any other embodiments discussed herein.

In some embodiments, the controller 746 of the eyewear device 702 processes information generated by the sensors 723 on the eyewear device 702 and/or another electronic device within the AR system 700. For example, the controller 746 can process information from the acoustic sensors 725-1 and 725-2. For each detected sound, the controller 716 can perform a direction of arrival (DOA) estimation to estimate a direction from which the detected sound arrived at the eyewear device 702 of the AR system 700. As one or more of the acoustic sensors 724 detects sounds, the controller 716 can populate an audio data set with the information (e.g., represented in FIG. 7C as sensor data 732).

In some embodiments, a physical electronic connector can convey information between the eyewear device 702 and another electronic device, and/or between one or more processors 710 of the AR system 700 or the VR system 710 and the controller 746. The information can be in the form of optical data, electrical data, wireless data, or any other transmittable data form. Moving the processing of information generated by the eyewear device 702 to an intermediary processing device can reduce weight and heat in the eyewear device, making it more comfortable and safer for a user. In some embodiments, an optional wearable accessory device (e.g., an electronic neckband) is coupled to the eyewear device 702 via one or more connectors. The connectors can be wired or wireless connectors and can include electrical and/or non-electrical (e.g., structural) components. In some embodiments, the eyewear device 702 and the wearable accessory device can operate independently without any wired or wireless connection between them.

In some situations, pairing external devices, such as an intermediary processing device (e.g., the HIPD device 800) with the eyewear device 702 (e.g., as part of the AR system 700) enables the eyewear device 702 to achieve a similar form factor of a pair of glasses while still providing sufficient battery and computation power for expanded capabilities. Some, or all, of the battery power, computational resources, and/or additional features of the AR system 700 can be provided by a paired device or shared between a paired device and the eyewear device 702, thus reducing the weight, heat profile, and form factor of the eyewear device 702 overall while allowing the eyewear device 702 to retain its desired functionality. For example, the wearable accessory device can allow components that would otherwise be included on an eyewear device 702 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the eyewear device 702, standing alone. Because weight carried in the wearable accessory device can be less invasive to a user than weight carried in the eyewear device 702, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

AR systems can include various types of computer vision components and subsystems. For example, the AR system 700 and/or the VR system 710 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An AR system can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 7B-1 and 7B-2 show the VR system 710 having cameras 739A to 739D, which can be used to provide depth information for creating a voxel field and a two-dimensional mesh to provide object information to the user to avoid collisions.

In some embodiments, the AR system 700 and/or the VR system 710 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

In some embodiments of an AR system, such as the AR system 700 and/or the VR system 710, ambient light (e.g., a live feed of the surrounding environment that a user would normally see) can be passed through a display element of a respective head-wearable device presenting aspects of the AR system. In some embodiments, ambient light can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment. For example, a visual user interface element (e.g., a notification user interface element) can be presented at the head-wearable device, and an amount of ambient light (e.g., 15-50% of the ambient light) can be passed through the user interface element, such that the user can distinguish at least a portion of the physical environment over which the user interface element is being displayed.

Example Handheld Intermediary Processing Devices

Figure 8B:
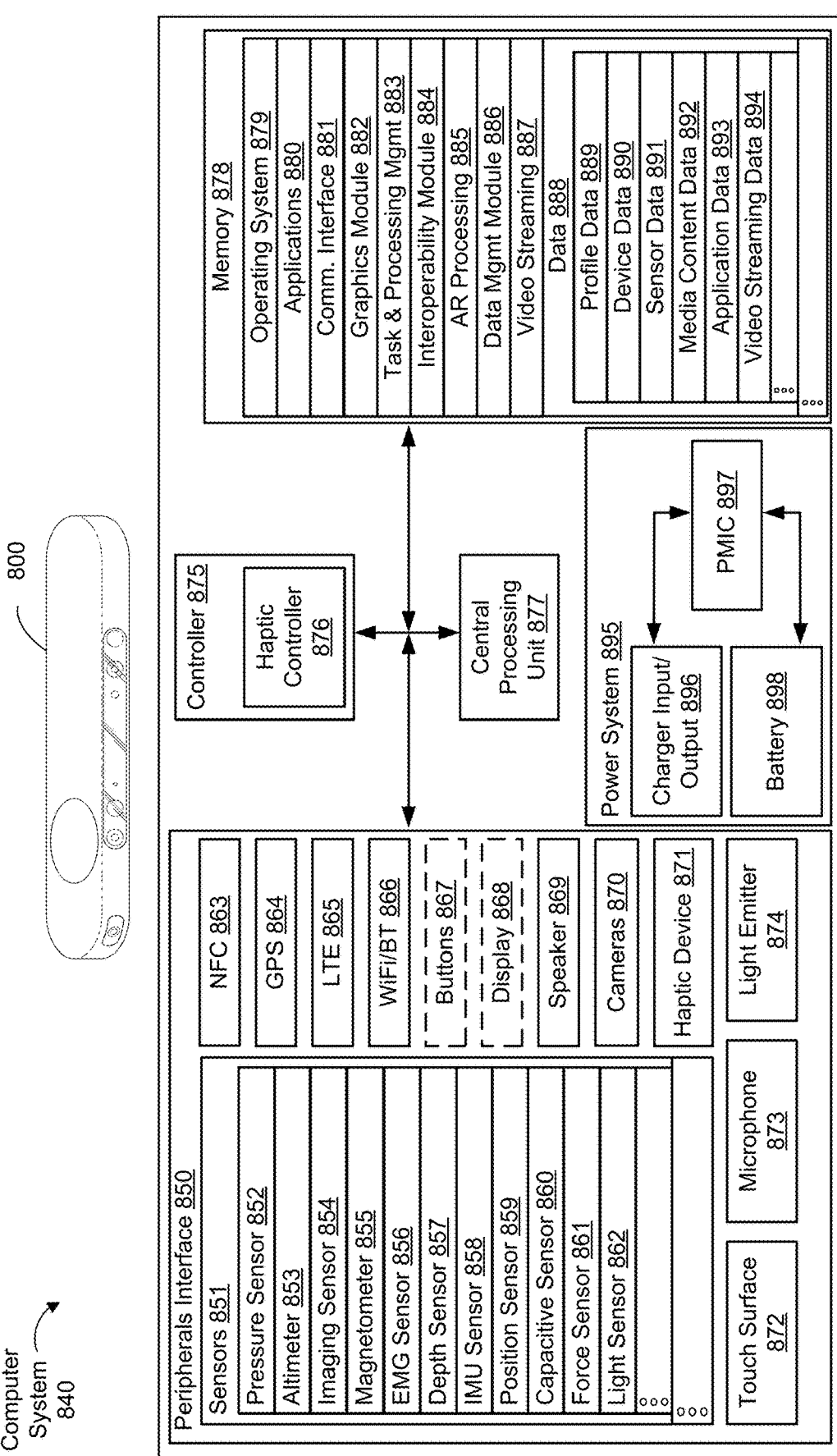

FIGS. 8A and 8B illustrate an example handheld intermediary processing device (HIPD) 800, in accordance with some embodiments. The HIPD 800 is an instance of the intermediary device described herein, such that the HIPD 800 should be understood to have the features described with respect to any intermediary device defined above or otherwise described herein, and vice versa. FIG. 8A shows a top view 805 and a side view 825 of the HIPD 800. The HIPD 800 is configured to communicatively couple with one or more wearable devices (or other electronic devices) associated with a user. For example, the HIPD 800 is configured to communicatively couple with a user's wrist-wearable device 600 (or components thereof, such as the watch body 620 and the wearable band 610), AR glasses 700, and/or VR headset 750. The HIPD 800 can be configured to be held by a user (e.g., as a handheld controller), carried on the user's person (e.g., in their pocket, in their bag, etc.), placed in proximity of the user (e.g., placed on their desk while seated at their desk, on a charging dock, etc.), and/or placed at or within a predetermined distance from a wearable device or other electronic device (e.g., where, in some embodiments, the predetermined distance is the maximum distance (e.g., 10 meters) at which the HIPD 800 can successfully be communicatively coupled with an electronic device, such as a wearable device).

The HIPD 800 can perform various functions independently and/or in conjunction with one or more wearable devices (e.g., wrist-wearable device 600, AR glasses 700, VR headset 750, etc.). The HIPD 800 is configured to increase and/or improve the functionality of communicatively coupled devices, such as the wearable devices. The HIPD 800 is configured to perform one or more functions or operations associated with interacting with user interfaces and applications of communicatively coupled devices, interacting with an AR environment, interacting with VR environment, and/or operating as a human-machine interface controller, as well as functions and/or operations described above with reference to FIGS. 1A-4. Additionally, as will be described in more detail below, functionality and/or operations of the HIPD 800 can include, without limitation, task offloading and/or handoffs; thermals offloading and/or handoffs; 6 degrees of freedom (6DoF) raycasting and/or gaming (e.g., using imaging devices or cameras 814, which can be used for simultaneous localization and mapping (SLAM) and/or with other image processing techniques); portable charging; messaging; image capturing via one or more imaging devices or cameras 822; sensing user input (e.g., sensing a touch on a touch input surface 802); wireless communications and/or interlining (e.g., cellular, near field, Wi-Fi, personal area network, etc.); location determination; financial transactions; providing haptic feedback; alarms; notifications; biometric authentication; health monitoring; sleep monitoring; etc. The above-example functions can be executed independently in the HIPD 800 and/or in communication between the HIPD 800 and another wearable device described herein. In some embodiments, functions can be executed on the HIPD 800 in conjunction with an AR environment. As the skilled artisan will appreciate upon reading the descriptions provided herein, the novel the HIPD 800 described herein can be used with any type of suitable AR environment.

While the HIPD 800 is communicatively coupled with a wearable device and/or other electronic device, the HIPD 800 is configured to perform one or more operations initiated at the wearable device and/or the other electronic device. In particular, one or more operations of the wearable device and/or the other electronic device can be offloaded to the HIPD 800 to be performed. The HIPD 800 performs the one or more operations of the wearable device and/or the other electronic device and provides to data corresponded to the completed operations to the wearable device and/or the other electronic device. For example, a user can initiate a video stream using AR glasses 700 and back-end tasks associated with performing the video stream (e.g., video rendering) can be offloaded to the HIPD 800, which the HIPD 800 performs and provides corresponding data to the AR glasses 700 to perform remaining front-end tasks associated with the video stream (e.g., presenting the rendered video data via a display of the AR glasses 700). In this way, the HIPD 800, which has more computational resources and greater thermal headroom than a wearable device, can perform computationally intensive tasks for the wearable device improving performance of an operation performed by the wearable device.

The HIPD 800 includes a multi-touch input surface 802 on a first side (e.g., a front surface) that is configured to detect one or more user inputs. In particular, the multi-touch input surface 802 can detect single tap inputs, multi-tap inputs, swipe gestures and/or inputs, force-based and/or pressure-based touch inputs, held taps, and the like. The multi-touch input surface 802 is configured to detect capacitive touch inputs and/or force (and/or pressure) touch inputs. The multi-touch input surface 802 includes a first touch-input surface 804 defined by a surface depression, and a second touch-input surface 806 defined by a substantially planar portion. The first touch-input surface 804 can be disposed adjacent to the second touch-input surface 806. In some embodiments, the first touch-input surface 804 and the second touch-input surface 806 can be different dimensions, shapes, and/or cover different portions of the multi-touch input surface 802. For example, the first touch-input surface 804 can be substantially circular and the second touch-input surface 806 is substantially rectangular. In some embodiments, the surface depression of the multi-touch input surface 802 is configured to guide user handling of the HIPD 800. In particular, the surface depression is configured such that the user holds the HIPD 800 upright when held in a single hand (e.g., such that the using imaging devices or cameras 814A and 814B are pointed toward a ceiling or the sky). Additionally, the surface depression is configured such that the user's thumb rests within the first touch-input surface 804.

In some embodiments, the different touch-input surfaces include a plurality of touch-input zones. For example, the second touch-input surface 806 includes at least a first touch-input zone 808 within a second touch-input zone 806 and a third touch-input zone 810 within the first touch-input zone 808. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 808 causes the HIPD 800 to perform a first command and a user input detected within the second touch-input zone 806 causes the HIPD 800 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 808 can be configured to detect force touch inputs (e.g., a magnitude at which the user presses down) and capacitive touch inputs, and the second touch-input zone 806 can be configured to detect capacitive touch inputs.

The HIPD 800 includes one or more sensors 851 for sensing data used in the performance of one or more operations and/or functions. For example, the HIPD 800 can include an IMU sensor that is used in conjunction with cameras 814 for 3-dimensional object manipulation (e.g., enlarging, moving, destroying, etc. an object) in an AR or VR environment. Non-limiting examples of the sensors 851 included in the HIPD 800 include a light sensor, a magnetometer, a depth sensor, a pressure sensor, and a force sensor. Additional examples of the sensors 851 are provided below in reference to FIG. 8B.

The HIPD 800 can include one or more light indicators 812 to provide one or more notifications to the user. In some embodiments, the light indicators are LEDs or other types of illumination devices. The light indicators 812 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 804. The light indicators can be illuminated in different colors and/or patterns to provide the user with one or more notifications and/or information about the device. For example, a light indicator positioned around the first touch-input surface 804 can flash when the user receives a notification (e.g., a message), change red when the HIPD 800 is out of power, operate as a progress bar (e.g., a light ring that is closed when a task is completed (e.g., 0% to 100%)), operates as a volume indicator, etc.).

In some embodiments, the HIPD 800 includes one or more additional sensors on another surface. For example, as shown FIG. 8A, HIPD 800 includes a set of one or more sensors (e.g., sensor set 820) on an edge of the HIPD 800. The sensor set 820, when positioned on an edge of the of the HIPD 800, can be pe positioned at a predetermined tilt angle (e.g., 26 degrees), which allows the sensor set 820 to be angled toward the user when placed on a desk or other flat surface. Alternatively, in some embodiments, the sensor set 820 is positioned on a surface opposite the multi-touch input surface 802 (e.g., a back surface). The one or more sensors of the sensor set 820 are discussed in detail below.

The side view 825 of the of the HIPD 800 shows the sensor set 820 and camera 814B. The sensor set 820 includes one or more cameras 822A and 822B, a depth projector 824, an ambient light sensor 828, and a depth receiver 830. In some embodiments, the sensor set 820 includes a light indicator 826. The light indicator 826 can operate as a privacy indicator to let the user and/or those around them know that a camera and/or microphone is active. The sensor set 820 is configured to capture a user's facial expression such that the user can puppet a custom avatar (e.g., showing emotions, such as smiles, laughter, etc., on the avatar or a digital representation of the user). The sensor set 820 can be configured as a side stereo RGB system, a rear indirect Time-of-Flight (iToF) system, or a rear stereo RGB system. As the skilled artisan will appreciate upon reading the descriptions provided herein, the novel HIPD 800 described herein can use different sensor set 820 configurations and/or sensor set 820 placements.

In some embodiments, the HIPD 800 includes one or more haptic devices 871 (FIG. 8B, e.g., a vibratory haptic actuator) that are configured to provide haptic feedback (e.g., kinesthetic sensation). The sensors 813, and/or the haptic devices 871 can be configured to operate in conjunction with multiple applications and/or communicatively coupled devices including, without limitation, a wearable device, health monitoring applications, social media applications, game applications, and artificial reality applications (e.g., the applications associated with artificial reality).

The HIPD 800 is configured to operate without a display. However, in optional embodiments, the HIPD 800 can include a display 868 (FIG. 8B). The HIPD 800 can also income one or more optional peripheral buttons 867 (FIG. 8B). For example, the peripheral buttons 867 can be used to turn on or turn off the HIPD 800. Further, the HIPD 800 housing can be formed of polymers and/or elastomer elastomers. The HIPD 800 can be configured to have a non-slip surface to allow the HIPD 800 to be placed on a surface without requiring a user to watch over the HIPD 800. In other words, the HIPD 800 is designed such that it would not easily slide off a surface. In some embodiments, the HIPD 800 include one or magnets to couple the HIPD 800 to another surface. This allows the user to mount the HIPD 800 to different surfaces and provide the user with greater flexibility in use of the HIPD 800.

As described above, the HIPD 800 can distribute and/or provide instructions for performing the one or more tasks at the HIPD 800 and/or a communicatively coupled device. For example, the HIPD 800 can identify one or more back-end tasks to be performed by the HIPD 800 and one or more front-end tasks to be performed by a communicatively coupled device. While the HIPD 800 is configured to offload and/or handoff tasks of a communicatively coupled device, the HIPD 800 can perform both back-end and front-end tasks (e.g., via one or more processors, such as CPU 877; FIG. 8B). The HIPD 800 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 800 can perform the above operations alone or in conjunction with a wearable device (or other communicatively coupled electronic device).

FIG. 8B shows block diagrams of a computing system 840 of the HIPD 800, in accordance with some embodiments. The HIPD 800, described in detail above, can include one or more components shown in HIPD computing system 840. The HIPD 800 will be understood to include the components shown and described below for the HIPD computing system 840. In some embodiments, all, or a substantial portion of the components of the HIPD computing system 840 are included in a single integrated circuit. Alternatively, in some embodiments, components of the HIPD computing system 840 are included in a plurality of integrated circuits that are communicatively coupled.

The HIPD computing system 860 can include a processor (e.g., a CPU 877, a GPU, and/or a CPU with integrated graphics), a controller 875, a peripherals interface 850 that includes one or more sensors 851 and other peripheral devices, a power source (e.g., a power system 895), and memory (e.g., a memory 878) that includes an operating system (e.g., an operating system 879), data (e.g., data 888), one or more applications (e.g., applications 880), and one or more modules (e.g., a communications interface module 881, a graphics module 882, a task and processing manage-ment module 883, an interoperability module 884, an AR processing module 885, a data management module 886, a video streaming module 887], etc.). The HIPD computing system 860 further includes a power system 895 that includes a charger input and output 896, a PMIC 897, and a battery 898, all of which are defined above.

In some embodiments, the peripherals interface 861 can include one or more sensors 821. The sensors 851 can include analogous sensors to those described above in reference to FIG. 6B. For example, the sensors 851 can include imaging sensors 854, (optional) EMG sensors 856, IMU sensors 858, and capacitive sensors 860. In some embodiments, the sensors 851 can include one or more pressure sensor 852 for sensing pressure data, an altimeter 853 for sensing an altitude of the HIPD 800, a magnetometer 855 for sensing a magnetic field, a depth sensor 857 (or a time-of flight sensor) for determining a difference between the camera and the subject of an image, a position sensor 859 (e.g., a flexible position sensor) for sensing a relative dis-placement or position change of a portion of the HIPD 800, a force sensor 861 for sensing a force applied to a portion of the HIPD 800, and a light sensor 862 (e.g., an ambient light sensor) for detecting an amount of lighting. The sensors 851 can include one or more sensors not shown in FIG. 8B.

Analogous to the peripherals described above in reference to FIGS. 6B, the peripherals interface 850 can also include an NFC component 863, a GPS component 864, an LTE component 865, a Wi-Fi and/or Bluetooth communication component 866, a speaker 869, a haptic device 879, and a microphone 871. As described above in reference to FIG. 8A, the HIPD 800 can optionally include a display 868 and/or one or more buttons 867. The peripherals interface 850 can further include one or more cameras 867, touch surfaces 872, and/or one or more light emitters 874. The multi-touch input surface 802 described above in reference to FIG. 8A is an example of touch surface 872. The light emitters 874 can be one or more LEDs, lasers, etc. and can be used to project or present information to a user. For example, the light emitters 874 can include light indicators 812 and 826 described above in reference to FIG. 8A. The cameras 870 (e.g., cameras 814 and 822 described above in FIG. 8A) can include one or more wide angle cameras, fish-eye cameras, spherical cameras, compound eye cameras (e.g., stereo and multi cameras), depth cameras, RGB cam-eras, ToF cameras, RGB-D cameras (depth and ToF cam-eras), and/or other available cameras. Cameras 870 can be used for SLAM; 6 DoF ray casting, gaming, object manipu-lation, and/or other rendering; facial recognition and facial expression recognition, etc.

Similar to the watch body computing system 660 and the watch band computing system 630 described above in reference to FIG. 6B, the HIPD computing system 840 can include one or more haptic controllers 876 and associated componentry (e.g., haptic devices 871) for providing haptic events at the HIPD 800.

Memory 878 can include high-speed random-access memory and/or non-volatile memory, such as one or more magnetic disk storage devices, flash memory devices, or other non-volatile solid-state memory devices. Access to the memory 878 by other components of the HIPD 800, such as the one or more processors and the peripherals interface 861, can be controlled by a memory controller of the controllers 875.

In some embodiments, software components stored in the memory 878 include one or more operating systems 879, one or more applications 880, one or more communication interface modules 881, one or more graphics modules 882, one or more data management modules 885, which are analogous to the software components described above in reference to FIG. 6B. The software components stored in the memory 878 can also include a video streaming module 886A, which is configured to perform the features described above in reference to FIGS. 1A-4.

In some embodiments, software components stored in the memory 878 include a task and processing management module 883 for identifying one or more front-end and back-end tasks associated with an operation performed by the user, performing one or more front-end and/or back-end tasks, and/or providing instructions to one or more commu-nicatively coupled devices that cause performance of the one or more front-end and/or back-end tasks. In some embodi-ments, the task and processing management module 883 uses data 888 (e.g., device data 890) to distribute the one or more front-end and/or back-end tasks based on communi-catively coupled devices' computing resources, available power, thermal headroom, ongoing operations, and/or other factors. For example, the task and processing management module 883 can cause the performance of one or more back-end tasks (of an operation performed at communica-tively coupled AR glasses 700) at the HIPD 800 in accor-dance with a determination that the operation is utilizing a predetermined amount (e.g., at least 70%) of computing resources available at the AR glasses 700.

In some embodiments, software components stored in the memory 878 include an interoperability module 884 for exchanging and utilizing information received and/or pro-vided to distinct communicatively coupled devices. The interoperability module 884 allows for different systems, devices, and/or applications to connect and communicate in a coordinated way without user input. In some embodi-ments, software components stored in the memory 878 include an AR module 885 that is configured to process signals based at least on sensor data for use in an AR and/or VR environment. For example, the AR module 885 can be used for 3D object manipulation, gesture recognition, facial and facial expression, recognition, etc.

The memory 880 can also include data 887, including structured data. In some embodiments, the data 887 can include profile data 889, device data 889 (including device data of one or more devices communicatively coupled with the HIPD 800, such as device type, hardware, software, configurations, etc.), sensor data 891, media content data 892, application data 893, and video streaming data 894, which stores data related to the performance of the features described above in reference to FIGS. 1A-4.

It should be appreciated that the HIPD computing system 840 is an example of a computing system within the HIPD 800, and that the HIPD 800 can have more or fewer components than shown in the HIPD computing system 840, combine two or more components, and/or have a different configuration and/or arrangement of the components. The various components shown in HIPD computing system 840 are implemented in hardware, software, firmware, or a combination thereof, including one or more signal processing and/or application-specific integrated circuits.

The techniques described above in FIG. 8A-8B can be used with any device used as a human-machine interface controller. In some embodiments, an HIPD 800 can be used in conjunction with one or more wearable device such as a head-wearable device (e.g., AR system 700 and VR system 710) and/or a wrist-wearable device 600 (or components thereof).

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory computer readable storage medium including instructions that, when executed by a computing device, cause the computing device to:
while a head-wearable device and a computing device are communicatively coupled:

in accordance with a determination, at a first point in time, that the head-wearable device satisfies one or more capture criteria:
cause a display of the head-wearable device to present a first user interface (UI) associated with an application running at one of the head-wearable device and the computing device, and
cause an imaging device of the head-wearable device to capture image data, and
cause the image data to stream to other communicatively coupled devices via the application; and
in accordance with a determination, at a second point in time, that the head-wearable device does not satisfy one or more capture criteria:
cause another display communicatively coupled with the computing device, distinct from the display of the head-wearable device, to present a second UI associated with the application running at one of the head-wearable device and the computing device, and
cause the imaging device of the head-wearable device to be disabled.

2. The non-transitory computer readable storage medium of claim 1, wherein the instructions, when executed by the computing device, further cause the computing device to:
in accordance with the determination, at the second point in time, that the head-wearable device does not satisfy one or more capture criteria:
cause the imaging device of the computing device to capture additional image data, and
cause the head-wearable device to stream the additional image data to the other communicatively coupled devices via the application.

3. The non-transitory computer readable storage medium of claim 1, wherein the instructions, when executed by the computing device, further cause the computing device to wait a predefined amount of time before disabling the imaging device of the head-wearable device.

4. The non-transitory computer readable storage medium of claim 1, wherein the second UI includes suggestions for satisfying one or more capture criteria.

5. The non-transitory computer readable storage medium of claim 1, wherein the one or more capture criteria include one or more head-wearable device specific thresholds including a thermal threshold, a battery threshold, a connectivity threshold, and a placement threshold.

6. The non-transitory computer readable storage medium of claim 5, wherein:
the thermal threshold includes a predefined temperature value;
the battery threshold includes a predefined battery percentage;
the connectivity threshold includes a predefined signal strength; and
the placement threshold includes one or more of predefined capacitive values for each temple arm of the head-wearable device and predefined distance values for each temple arm of the head-wearable device.

7. The non-transitory computer readable storage medium of claim 1, wherein streaming image data to the other communicatively coupled devices via the application includes causing the application to present an attribution UI element.

8. The non-transitory computer readable storage medium of claim 1, wherein the second UI is presented as part of at least one of a mobile application, a web application, and a streaming platform running on one of the other communicatively coupled devices.

9. The non-transitory computer readable storage medium of claim 1, wherein the first UI and the second UI include one or more UI elements indicating that at least one of a microphone communicatively coupled with the head-wearable device and the imaging device of the head-wearable device are active.

10. The non-transitory computer readable storage medium of claim 1, wherein streaming the image data to the other communicatively coupled devices via the application includes:

providing the image data to the computing device; and transmitting, via the computing device, the image data to the other communicatively coupled devices.

11. The non-transitory computer readable storage medium of claim 10, wherein the head-wearable device provides the image data to the computing device via Bluetooth.

12. The non-transitory computer readable storage medium of claim 10, wherein the instructions, when executed by the computing device, further cause the computing device to:

before providing the image data to the computing device, cause the computing device to send one or more parameters for encoding the image data to the head-wearable device.

13. The non-transitory computer readable storage medium of claim 10, wherein the instructions, when executed by the computing device, further cause the computing device to:

before transmitting, via the computing device, the image data to the other communicatively coupled devices, cause a communicatively display coupled with the computing device to display a preview of the image data.

14. The non-transitory computer readable storage medium of claim 1, wherein the instructions, when executed by the computing device, further cause the computing device to:

before streaming the image data to the other communicatively coupled devices, apply one or more corrective algorithms to the image data, and transmit the image data to the other communicatively coupled devices.

15. The non-transitory computer readable storage medium of claim 1, wherein the instructions, when executed by the computing device, further cause the computing device to:

while streaming the image data:

receive, via the application, one or more engagement events corresponding to the image data; and present, at one of the display of the head-wearable device and the display communicatively coupled with the computing device, the one or more engagement events.

16. The non-transitory computer readable storage medium of claim 1, wherein the first UI includes one or more icons presented at the head-wearable device.

17. A head-wearable device comprising:

a frame;

a display;

an imaging device; and memory, including instructions that, when executed by a computing device communicatively coupled to the head-wearable device, cause the computing device to:

while the head-wearable device and the computing device are communicatively coupled:

in accordance with a determination, at a first point in time, that the head-wearable device satisfies one or more capture criteria:

cause the display to present a first user interface (UI) associated with an application running at one of the head-wearable device and the computing device, and cause the imaging device to capture image data, and cause the image data to stream to other communicatively coupled devices via the application; and in accordance with a determination, at a second point in time, that the head-wearable device does not satisfy one or more capture criteria:

cause another display communicatively coupled with the computing device, distinct from the display of the head-wearable device, to present a second UI associated with the application running at one of the head-wearable device and the computing device, and cause the imaging device to be disabled.

18. The head-wearable device claim 17, wherein the instructions, when executed by the computing device communicatively coupled to the head-wearable device, further cause the computing device to:

in accordance with the determination, at the second point in time, that the head-wearable device does not satisfy one or more capture criteria:

cause the imaging device to capture additional image data, and cause the head-wearable device to stream the additional image data to other communicatively coupled devices via the application.

19. A method for streaming image data from a head-wearable device, the method comprising:

while a head-wearable device and a computing device are communicatively coupled:

in accordance with a determination, at a first point in time, that the head-wearable device satisfies one or more capture criteria:

causing a display of the head-wearable device to present a first user interface (UI) associated with an application running at one of the head-wearable device and the computing device, and causing an imaging device of the head-wearable device to capture image data, and causing the image data to stream to other communicatively coupled devices via the application; and in accordance with a determination, at a second point in time, that the head-wearable device does not satisfy one or more capture criteria:

causing another display communicatively coupled with the computing device, distinct from the display of the head-wearable device, to present a second UI associated with the application running at one of the head-wearable device and the computing device, and causing the imaging device of the head-wearable device to be disabled.

20. The method of claim 19, the method further comprising:

in accordance with the determination, at the second point in time, that the head-wearable device does not satisfy one or more capture criteria:

causing the imaging device of the computing device to capture additional image data, and causing the head-wearable device to stream the additional image data to other communicatively coupled devices via the application.

\* \* \* \* \*